United States Patent
Webber et al.

(10) Patent No.: US 12,004,919 B2
(45) Date of Patent: Jun. 11, 2024

(54) DENTAL ATTACHMENT PLACEMENT STRUCTURE

(71) Applicant: Align Technology, Inc., San Jose, CA (US)

(72) Inventors: Peter Webber, Santa Clara, CA (US); Siobhan O'Leary, Santa Clara, CA (US)

(73) Assignee: Align Technology, Inc., San Jose, CA (US)

(*) Notice: Subject to any disclaimer, the term of this patent is extended or adjusted under 35 U.S.C. 154(b) by 113 days.

(21) Appl. No.: 17/446,268

(22) Filed: Aug. 27, 2021

(65) Prior Publication Data

US 2021/0386524 A1    Dec. 16, 2021

Related U.S. Application Data

(63) Continuation of application No. 15/623,263, filed on Jun. 14, 2017, now Pat. No. 11,103,330, which is a
(Continued)

(51) Int. Cl.
*A61C 7/00* (2006.01)
*A61C 7/08* (2006.01)
*A61C 7/14* (2006.01)
*B29C 64/386* (2017.01)
*B33Y 10/00* (2015.01)
(Continued)

(52) U.S. Cl.
CPC .............. *A61C 7/146* (2013.01); *A61C 7/002* (2013.01); *A61C 7/08* (2013.01); *B29C 64/386* (2017.08); *B33Y 10/00* (2014.12); *B33Y 50/00* (2014.12); *B33Y 50/02* (2014.12); *B33Y 80/00* (2014.12);
(Continued)

(58) Field of Classification Search
CPC ....................................................... A61C 7/146
See application file for complete search history.

(56) References Cited

U.S. PATENT DOCUMENTS 4,117,596 A * 10/1978 Wallshein ................ A61C 7/12
433/9
4,360,341 A    11/1982 Dellinger
(Continued)

OTHER PUBLICATIONS

"Integral." Merriam-Webster.com Dictionary, Merriam-Webster, https://www.merriam-webster.com/dictionary/integral. Accessed Oct. 10, 2023. (Year: 2023).*
(Continued)

*Primary Examiner* — Heidi M Eide
(74) *Attorney, Agent, or Firm* — Shay Glenn LLP

(57) ABSTRACT

Dental attachment placement templates and dental appliance systems. The dental attachment placement templates may include a body configured to position a dental attachment over an attachment site on a surface of a tooth. The body may include an aperture, supports that extend from the body within the aperture, a connection member that connects the dental attachment to the supports, and a contoured surface shaped to register with one or more teeth. The connection member may be integrally formed with the dental attachment to provide a unitary structure. The connection member may be joined to the dental attachment at a breakable single point of connection and being further joined to the supports such that when the single point of connection is broken, the dental attachment is detached from the supports.

23 Claims, 15 Drawing Sheets

Related U.S. Application Data continuation-in-part of application No. 14/963,527, filed on Dec. 9, 2015, now Pat. No. 11,596,502.

(51) Int. Cl.
  *B33Y 50/00* (2015.01)
  *B33Y 50/02* (2015.01)
  *B33Y 80/00* (2015.01)
  *A61C 13/00* (2006.01)
  *B29L 31/00* (2006.01)

(52) U.S. Cl.
  CPC ... *A61C 13/0013* (2013.01); *B29L 2031/7536* (2013.01)

(56) References Cited

U.S. PATENT DOCUMENTS

| | | | |
|---|---|---|---|
| 5,575,649 A * | 11/1996 | Lee | A61C 3/00 433/141 |
| 5,820,368 A | 10/1998 | Wolk | |
| 6,309,215 B1 * | 10/2001 | Phan | A61C 9/00 433/24 |
| 6,386,864 B1 | 5/2002 | Kuo | |
| 6,783,604 B2 | 8/2004 | Tricca | |
| 6,790,035 B2 | 9/2004 | Tricca et al. | |
| 6,947,038 B1 | 9/2005 | Anh et al. | |
| 7,104,792 B2 | 9/2006 | Taub et al. | |
| 7,160,107 B2 | 1/2007 | Kopelman et al. | |
| 7,448,514 B2 | 11/2008 | Wen | |
| 7,600,999 B2 | 10/2009 | Knopp | |
| 7,766,658 B2 | 8/2010 | Tricca et al. | |
| 7,771,195 B2 | 8/2010 | Knopp et al. | |
| 7,871,269 B2 | 1/2011 | Wu et al. | |
| 7,883,334 B2 | 2/2011 | Li et al. | |
| 7,914,283 B2 | 3/2011 | Kuo | |
| 8,235,715 B2 | 8/2012 | Kuo | |
| 8,337,199 B2 | 12/2012 | Wen | |
| 8,401,686 B2 | 3/2013 | Moss et al. | |
| 8,562,337 B2 | 10/2013 | Kuo et al. | |
| 8,684,729 B2 | 4/2014 | Wen | |
| 8,758,009 B2 | 6/2014 | Chen et al. | |
| 9,119,691 B2 | 9/2015 | Namiranian et al. | |
| 9,326,831 B2 | 5/2016 | Cheang | |
| 9,655,691 B2 | 5/2017 | Li et al. | |
| 9,700,385 B2 | 7/2017 | Webber | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,314,673 B2 * | 6/2019 | Schulhof | A61C 7/146 |
| 10,363,116 B2 | 7/2019 | Boronkay | |
| D865,180 S | 10/2019 | Bauer et al. | |
| 10,463,452 B2 | 11/2019 | Matov et al. | |
| 10,492,888 B2 | 12/2019 | Chen et al. | |
| 10,517,701 B2 | 12/2019 | Boronkay | |
| 10,537,463 B2 | 1/2020 | Kopelman | |
| 10,555,792 B2 | 2/2020 | Kopelman et al. | |
| 10,588,776 B2 | 3/2020 | Cam et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,881,487 B2 | 1/2021 | Cam et al. | |
| 10,912,629 B2 | 2/2021 | Tanugula et al. | |
| 11,154,382 B2 | 10/2021 | Kopelman et al. | |
| 11,166,788 B2 | 11/2021 | Webber | |
| 11,174,338 B2 | 11/2021 | Liska et al. | |
| 2001/0002310 A1 * | 5/2001 | Chishti | B33Y 50/00 433/213 |
| 2004/0166462 A1 | 8/2004 | Phan et al. | |
| 2005/0014105 A1 | 1/2005 | Abolfathi et al. | |
| 2005/0244768 A1 | 11/2005 | Taub et al. | |
| 2006/0019218 A1 | 1/2006 | Kuo | |
| 2006/0040235 A1 * | 2/2006 | Davis | A61C 13/245 433/185 |
| 2006/0078841 A1 | 4/2006 | Desimone et al. | |
| 2006/0093984 A1 * | 5/2006 | Rosenberg | A61C 7/145 433/18 |
| 2006/0199142 A1 | 9/2006 | Liu et al. | |
| 2007/0190476 A1 | 8/2007 | Dellinger | |
| 2008/0160473 A1 | 7/2008 | Li et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2014/0051039 A1 * | 2/2014 | Jensen | A61K 6/30 523/118 |
| 2014/0067334 A1 | 3/2014 | Kuo | |
| 2015/0064641 A1 | 3/2015 | Gardner | |
| 2015/0265376 A1 | 9/2015 | Kopelman | |
| 2015/0338844 A1 | 11/2015 | Matty | |
| 2015/0366638 A1 | 12/2015 | Kopelman et al. | |
| 2016/0193014 A1 | 7/2016 | Morton et al. | |
| 2016/0242870 A1 | 8/2016 | Matov et al. | |
| 2016/0318247 A1 | 11/2016 | Schlachter | |
| 2016/0346064 A1 * | 12/2016 | Schulhof | B33Y 80/00 |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0065373 A1 | 3/2017 | Martz et al. | |
| 2018/0161126 A1 * | 6/2018 | Marshall | A61C 7/146 |
| 2019/0000592 A1 | 1/2019 | Cam et al. | |
| 2019/0000593 A1 | 1/2019 | Cam et al. | |
| 2019/0029775 A1 | 1/2019 | Morton et al. | |
| 2019/0125497 A1 | 5/2019 | Derakhshan et al. | |
| 2019/0239983 A1 | 8/2019 | Matty | |
| 2019/0262101 A1 | 8/2019 | Shanjani et al. | |
| 2019/0314119 A1 | 10/2019 | Kopelman et al. | |
| 2019/0343606 A1 | 11/2019 | Wu et al. | |
| 2020/0000553 A1 | 1/2020 | Makarenkova et al. | |
| 2020/0086553 A1 | 3/2020 | Mojdeh et al. | |
| 2020/0100864 A1 | 4/2020 | Wang et al. | |
| 2020/0100865 A1 | 4/2020 | Wang et al. | |
| 2020/0100866 A1 | 4/2020 | Medvinskaya et al. | |
| 2020/0100871 A1 | 4/2020 | Wang et al. | |
| 2020/0155276 A1 | 5/2020 | Cam et al. | |
| 2020/0188062 A1 | 6/2020 | Kopelman et al. | |
| 2020/0214598 A1 | 7/2020 | Li et al. | |
| 2020/0214801 A1 | 7/2020 | Wang et al. | |
| 2020/0390523 A1 | 12/2020 | Sato et al. | |
| 2021/0078357 A1 | 3/2021 | Venkatasanthanam et al. | |
| 2021/0147672 A1 | 5/2021 | Cole et al. | |

OTHER PUBLICATIONS

"Disintegrate." Merriam-Webster.com Dictionary, Merriam-Webster, https://www.merriam-webster.com/dictionary/disintegrate. Accessed Oct. 10, 2023. (Year: 2023).*

* cited by examiner

DENTAL ATTACHMENT PLACEMENT STRUCTURE

CROSS REFERENCE TO RELATED APPLICATIONS

This application is a continuation of U.S. patent application Ser. No. 15/623,263, filed on Jun. 14, 2017, titled "DENTAL ATTACHMENT PLACEMENT STRUCTURE," now U.S. Pat. No. 11,103,330, which is a continuation-in-part of U.S. patent application Ser. No. 14/963,527, filed on Dec. 9, 2015, titled "DENTAL ATTACHMENT PLACEMENT STRUCTURE," now U.S. Publication No. US-2017-0165032-A1, each of which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The present disclosure provides methods, computing device readable medium, devices, and systems that utilize dental attachment placement structures prior to or during dental treatment. Dental treatments involve restorative and/or orthodontic procedures to improve the quality of life of a patient.

For example, restorative procedures may be designed to implant a dental prosthesis (e.g., a crown, bridge, inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth or a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Attachments are affixed to the one or more teeth of the patient (typically with an adhesive material, such as an attachment composite material) or directly cured to the tooth. These attachments interact with surfaces on the appliance to impart forces on one or more teeth.

Such systems typically utilize a set of appliances that can be used serially such that, as the teeth move, a new appliance from the set can be implemented to further move the teeth without having to take a new impression of the patient's teeth at every increment of tooth movement in order to make each successive appliance. The same attachments may be utilized with successive appliances or attachments may be added, removed, or replaced with other attachment shapes that may impart different force characteristics than a previous appliance and attachment combination (i.e., appliance and one or more attachments).

Currently, attachments can be formed by hand by a treatment professional (e.g., a doctor or assistant). In this process, a treatment professional selects an attachment material to be used and inserts the material into a well, formed in a sheet of material, to the desired exterior shape of the attachment is provided to the treatment professional and the mixed attachment material is pushed into the well to form the attachment based on the shape of the well.

The attachment is then removed from the well and then put on a tooth and cured. The mixing of the attachment material and amount of attachment composite put into attachment wells on templates are uncontrolled, and therefore errors can occur.

The absolute position of the attachment on the tooth is also subject to user error. When this occurs, the mismatch between the position and/or orientation of the attachment in relation to a contact surface on the appliance, may make using the appliance difficult or impossible and/or make the appliance less effective (reduction of one or more forces being applied by the combination of the attachment and appliance) or provide an incorrect effect (location and/or orientation of the attachment provides different force characteristics than was intended).

Accordingly, the positioning, orientation, and securing of attachments is typically done by a treatment professional at a dentist or orthodontist's office. However, treatment professionals can make one or more errors when mixing, forming, positioning, orienting, or securing one or more of the attachments and as such, the appliance and attachment combination may not fit together correctly or impart the correct one or more forces.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
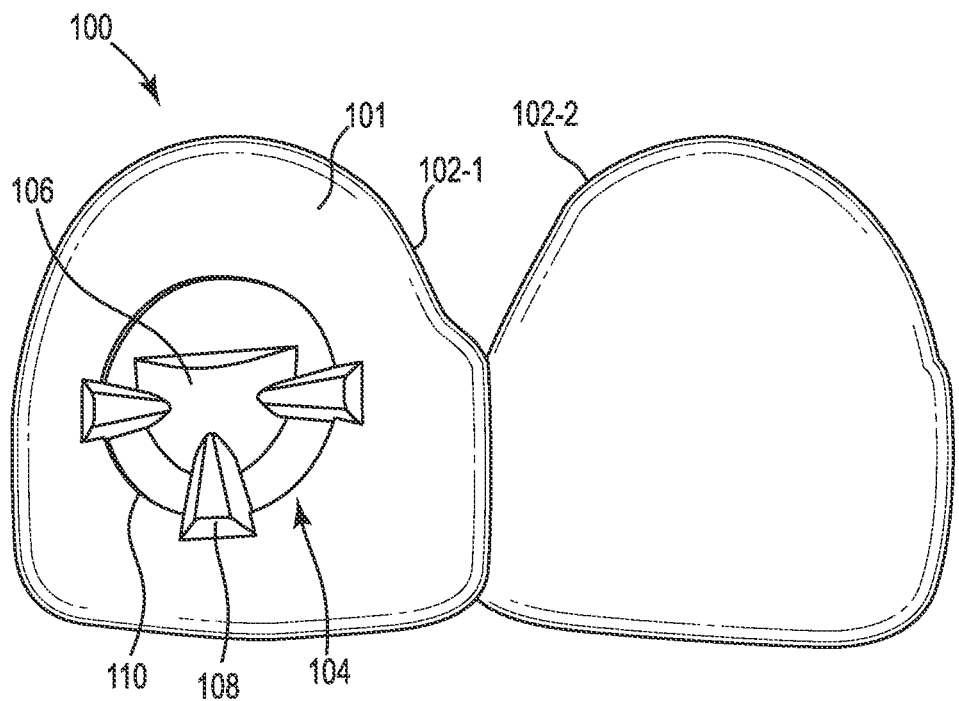
FIG. 1A illustrates a front view of a dental attachment placement structure for placement of an attachment according to a number of embodiments of the present disclosure.

The present disclosure provides methods, computing device readable medium, devices, and systems having a dental attachment placement structure. Such solutions should make mixing, forming, positioning, orienting, and securing attachments easier and quicker, and can make the patient's experience better than use of past procedures.

One dental attachment placement apparatus includes a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designators "M", "N", "P", "R", "S", "T", and "V", particularly with respect to reference numerals in the drawings, indicate that any number of the particular feature so designated can be included. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1A, and a similar element may be referenced as 301 in FIG. 3A.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1A illustrates a front view of a dental attachment placement structure for placement of an attachment according to a number of embodiments of the present disclosure. In the embodiment of FIG. 1A, the apparatus 100 includes a body 101 having at least one surface shaped to conform to one or more of the contours of an exterior surface of a tooth. In the case of the embodiment of FIG. 1A, the body has multiple surfaces, (inner surfaces of portions 102-1 and 102-2), each shaped to conform to the multiple contours of an exterior surface of a tooth, and other surfaces will be discussed in more detail in FIG. 1B.

The body 101 also includes an attachment mounting structure 104 including the attachment 106, an aperture 110 to allow placement of the attachment 106 on the surface of a tooth, and a number of supports 108. The structure illustrated in FIG. 1A, allows the treatment professional to place the apparatus 100 onto the teeth of a patient to provide a more accurate position and orientation for the attachment 106, with respect to the tooth surface, during the securing of the attachment 106 to the surface of the tooth than previous techniques.

The securing of the attachment can be accomplished in any suitable manner. For example, the attachment can be cured to the tooth surface, for instance, by use of a light source, such as ultra-violet (UV) light source, which will bond the attachment material directly to the surface of the tooth. In some embodiments, an adhesive material can be applied to the back side of the attachment and the adhesive can be used to secure the attachment to the tooth surface.

In various embodiments, the apparatus can be designed to have one surface shaped to conform to one or more contours of an exterior surface of a tooth (e.g., a surface that conforms to a portion of the front surface of a tooth), such that when the two surfaces are aligned, their contours match, thereby indicating to the treatment professional that the apparatus has been placed correctly.

This correct placement can be with respect to the placement of the apparatus with respect to the tooth in one or more dimensions (e.g., up, down, right, left, rotationally, etc. with respect to the tooth surface upon which the attachment will be applied). If the apparatus is correctly placed, then the attachment will also be correctly placed with respect to the tooth surface.

As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth). For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 1B:
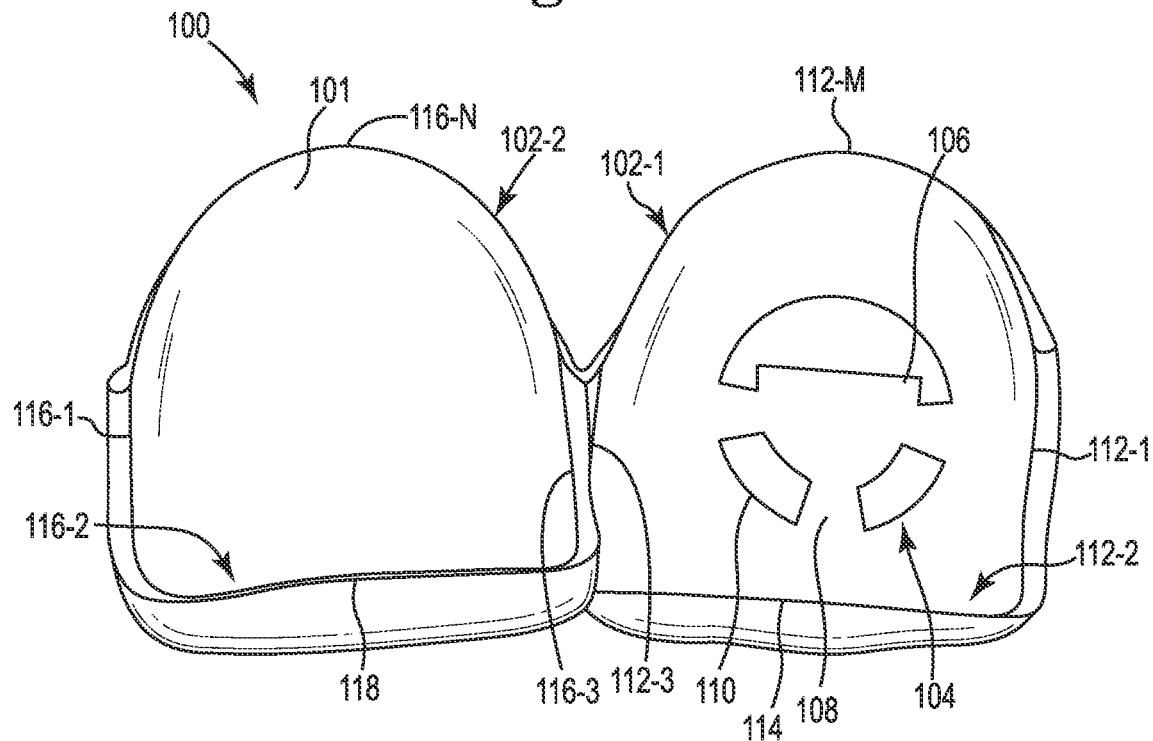
FIG. 1B illustrates a back view of the dental attachment placement structure of FIG. 1A.

In the embodiment of FIGS. 1A and 1B, the apparatus includes many surfaces that are shaped to conform to many contours of many exterior surfaces of multiple teeth (e.g., one or more contours of the front surface, side surfaces, edge surfaces, back surface, etc.).

Generally, the more surfaces used, the more accurate the positioning and/or orientation of the attachment, in relation to the tooth, can be to the desired correct placement. Also, when attaching multiple attachments, these surfaces can be used to accurately position and orient the attachments in relation to each other.

Once an attachment is placed on the tooth, it has to be secured to the tooth and the apparatus has to be removed. In some embodiments, such as that shown in FIGS. 1A and 1B, the apparatus can include one or more supports connecting the attachment to the body.

In such embodiments, the one or more supports can be made from a material that allows the support material 108 to be separated from the material of the attachment 106. For example, the support can be made from a material that can be broken at or near the location where the support and attachment are connected.

In some embodiments, the attachment between the support and the attachment can be released by a release agent, such as a chemical, heat, moisture, or other type of release agent. The release agent may, for example, dissolve a portion of the support and/or attachment in order to release the support and/or attachment from each other.

In various embodiments, the support and attachment can be fabricated from the same material, but the structure of the support can be such that it can be broken at a point to disconnect it from the attachment. Any suitable technique can be used to achieve the breaking or release of the support and/or attachment material in order to release the support from the attachment.

For example, the support structure may include a narrow section that is conducive to breaking at that location. In another embodiment, the support structure may include a scored section that is conducive to breaking at that location.

In various embodiments, the attachment can be mechanically mounted to the supports such that the attachment can be released from the supports once the attachment is secured to the surface of the tooth. This can be accomplished by any suitable releasable attachment structure. For example, one suitable structure is a groove located on each support and corresponding mating flanges on the attachment surface that can be slid out of the grooves to release the attachment from the supports.

FIG. 1B illustrates a back view of the dental attachment placement structure of FIG. 1A. In this view, the back side of the body 101 is shown including the back side of the attachment mounting structure 104 including the attachment 106 and supports 108, and the two inner surfaces of portions 102-1 and 102-2 of the body 101, each shaped to conform to the multiple contours of an exterior surface of a tooth are shown.

As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 102-1 shown in FIG. 1A), then when the apparatus is pressed against the front surface of the tooth such that the contours of the tooth and the apparatus correspond to each other, the attachment will be correctly oriented with respect to the angle of the back side of the attachment to the surface of the tooth.

In the view shown in FIG. 1B, more surfaces shaped to conform to the multiple contours of an exterior surface of a tooth are shown than were visible in the view of FIG. 1A. As discussed above, if another surface is used, for example, a side surface 112-1, then the placement of the attachment can be more accurately accomplished with respect to its position and orientation.

For instance, when the side 112-1 is positioned along the corresponding side of the tooth such that their contours align, then the attachment should be the correct distance from the side of the tooth and will be correctly oriented with respect to the angle of the back side of the attachment to the surface of the tooth.

When more surfaces are utilized, the position and/or orientation of the attachment can be further precisioned. For example, the body 101 includes side surfaces 112-1, 112-3 of a first tooth, and side surfaces 116-1 and 116-3 of a second tooth. The body 101 also includes surfaces that are shaped to conform to the gingival line on a tooth 112-M and 116-N, and surfaces 112-2 and 116-2 that conform to the bottom edge of a tooth (and/or the bottom of the front and/or back side of the tooth).

Additionally, the embodiment of FIG. 1B includes a portion that conforms to the back side of the first tooth 114 and another portion that conforms to the back side of the second tooth 118. The use of such surfaces in conjunction with other surfaces can also allow for use of the corners of the teeth to be used to aid in positioning and/or orientation of an attachment. For example, the apparatus can be slid onto the tooth until the bottom edge of the tooth contacts the bottom edge 112-2 of the apparatus. When the front surface, the sides, corners, and bottom of the apparatus are aligned with their corresponding tooth surfaces, the attachment can be very precisely placed on its intended tooth surface.

Figure 1C:
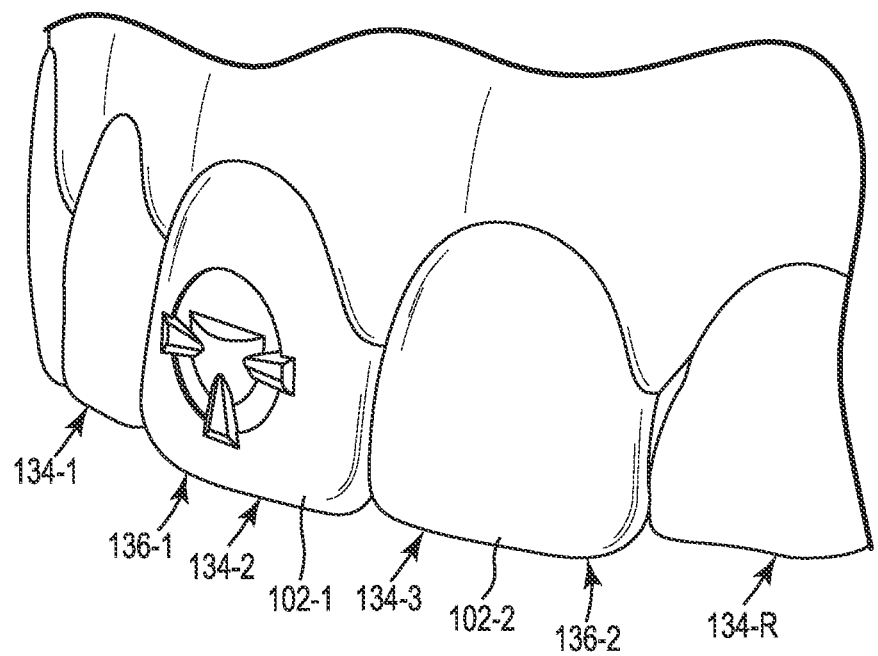
FIG. 1C illustrates a front view of the dental attachment placement structure of FIGS. 1A and 1B positioned on a tooth of a patient.

FIG. 1C illustrates a front view of the dental attachment placement structure of FIGS. 1A and 1B positioned on a tooth of a patient. In the view of FIG. 1C, several teeth and the gingiva of a patient are illustrated, including teeth 134-1, 134-2, 134-3, and 134-R. The apparatus 100 has been placed on the two of the teeth (134-2 and 134-3) such that the inner surfaces of portions 102-1 and 102-2 are placed in contact with tooth surfaces 136-1 and 136-2, respectively.

Figure 1D:
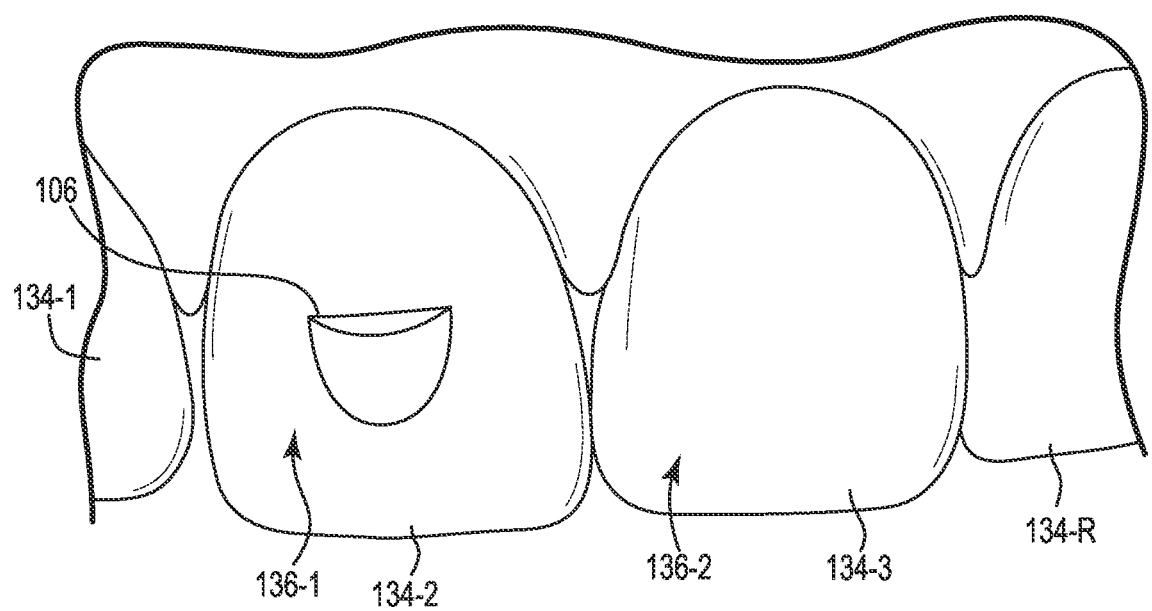
FIG. 1D illustrates a front view of a dental attachment attached to a tooth of a patient utilizing the dental attachment placement structure of FIGS. 1A and 1B.

FIG. 1D illustrates a front view of a dental attachment attached to a tooth of a patient utilizing the dental attachment placement structure of FIGS. 1A and 1B. The resultant placement has been accomplished via the attachment mounting structure illustrated in FIGS. 1A and 1B.

In this manner, the attachment 106 has been correctly positioned on the surface 136-1 of tooth 134-2 and oriented such that it can provide the desired force to the teeth of the patient (e.g., 134-1, 134-2, 134-3, 134-R, and/or other teeth of the patient) when combined with the dental appliance that will attach to the attachment.

In some embodiments, such as that shown in FIGS. 1A-1C, the attachment and/or the dental attachment placement structure, can be fabricated through direct fabrication, such as via a three-dimensional (3D) printer). This can be beneficial as the treatment profession can print these components at their location rather than at a manufacturing facility. Further, these components do not need to be formed around a mold of teeth when direct printed, this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, a dental attachment placement apparatus can be formed by printing, using a three-dimensional printing apparatus, an attachment, out of an attachment material and printing, using a three-dimensional printing apparatus, a dental attachment placement structure, connected to the attachment to hold the attachment in a particular position. In some embodiments, the dental attachment placement structure and the attachment can be fabricated from the same material. Material, examples include: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof, which can be used to make dental appliances, such as aligners, or curable composite (e.g., a resin material) that can be used to attach orthodontic appliances to teeth or create orthodontic structures.

In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

As discussed herein, one other benefit to direct fabrication is that one or more surfaces that will be used to attach the attachment to a tooth and/or to position an attachment with respect to one or more teeth can be fabricated with surfaces that will mate with the corresponding surface of the one or more teeth to accomplish these functionalities (attachment and/or positioning of the attachment). This can be accomplished by virtual design of these surfaces and then using these virtual designs to fabricate the attachment and/or the dental attachment placement structure directly.

Figure 2:
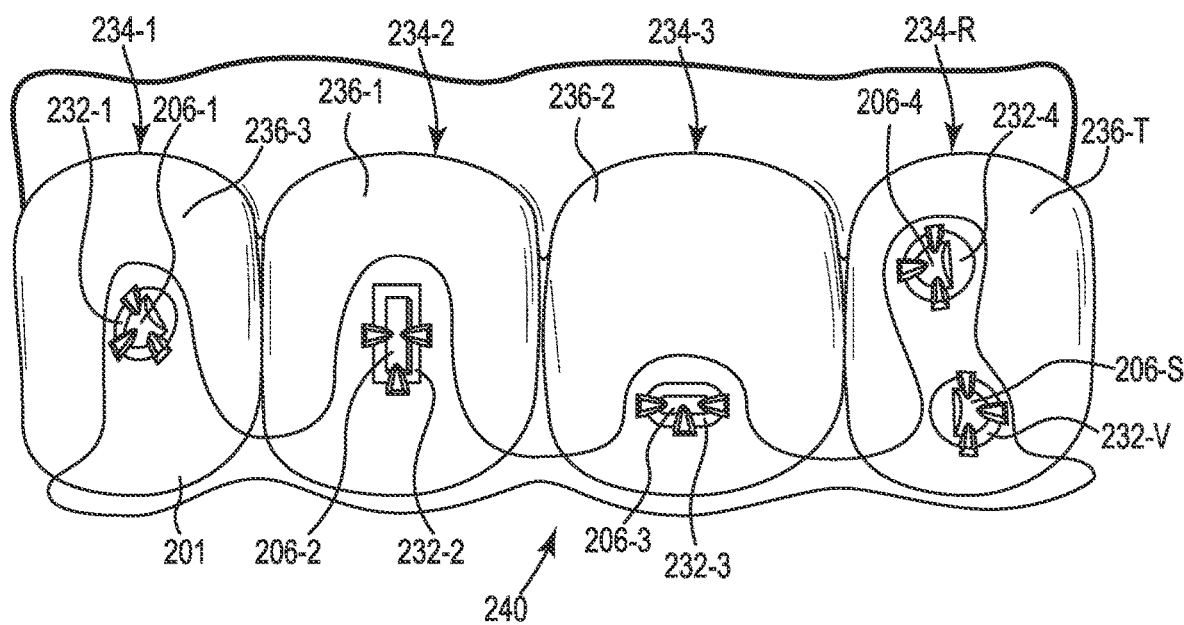
FIG. 2 illustrates a front view of a dental attachment placement structure having multiple attachment placement components provided on the structure according to a number of embodiments of the present disclosure.

FIG. 2 illustrates a front view of a dental attachment placement structure having multiple attachment placement components provided on the structure according to a number of embodiments of the present disclosure. In the embodiment of FIG. 2, the body 201 of apparatus 240 has an attachment mounting structure has an aperture 232-1 with an attachment 206-1 placed in the aperture. Through use of the apparatus 240, the attachment is in the desired position and orientation for securing to the surface 236-3 of tooth 234-1.

Attachments 206-2, 206-3, 206-4, and 206-S are also positioned in apertures 232-2, 232-3, 232-4, and 232-V on surface 236-1 of tooth 234-2, 236-2 of tooth 234-3, and 236-T of tooth 234-R. In such an embodiment, one or more of the teeth can have multiple attachments affixed thereon.

In order to save fabrication time and materials cost, the apparatus may include multiple attachment locations and only some may be used at any given time. In such applications, the apparatus 240 can, for example, be used to affix attachment 206-2 at one point in time and can be reused to attach 206-S at aperture 232-V or an attachment at one or more of the other locations on the apparatus (e.g., apertures 232-1, 232-2, and/or 232-3) at a different time.

Another feature of the embodiment of FIG. 2, is that in order to save fabrication time and materials cost, an apparatus with less material can be used. In such embodiments, the apparatus can be designed such that a reduced amount or minimized amount of material is used in order to properly position the attachment at a desired location.

Further, in prior concepts, treatment professionals may only have had access to a few, standardized attachment shapes. In this manner, the options for treatment may have been restricted based on the limited forces that could be provided by the standardized attachments. If any other attachment shape was desired, the treatment professional could file or grind the attachment surfaces to change its shape, but a treatment plan would not take these modifications into account and therefore the actual result would be different than the treatment plan result. This resulted in additional time spent in getting the proper shape, misshapen attachments that did not fit or function correctly, and other issues.

Although embodiments of the present disclosure can be used to form such standardized attachments, since the apparatus can be fabricated to be used with a specific patient's teeth positioning, specialized attachments can also be designed and can be made available to a treatment professional.

Such specialization can also, for example, include the size of the attachment, shape of the attachment, and other suitable specialized characteristics. Accordingly, the patient will be able to get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates are created. Further, in various embodiments, this customization can be made for each appliance (or for multiple appliances) in a set of appliances of a treatment plan.

In some embodiments, a computing device (such as that described in relation to FIG. 10 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances, attachments, and/or attachment placement structures. In some embodiments, a computing device can be used to virtually model such dental appliances, attachments, and/or attachment placement structures.

For example, through use of a treatment plan and/or virtual modeling, a dental appliance (e.g., an aligner for aligning teeth or jaws of a patient) or attachment placement structure can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a SLA or 3D printing machine, to form and/or create the dental mold. As discussed above, the result of the dental mold can include a set of molded teeth.

The set of molded teeth can include at least a replica of a number of teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance or attachment placement structure can be formed by layering a thermoformable sheet of material and/or multiple sheets of one or more materials over the dental mold. The materials can include a polymeric material, for instance.

Generally, the dental appliance or attachment placement structure is produced and/or formed by heating the polymeric thermoformable sheet and vacuum or pressure forming the sheet over the dental mold (e.g., a number of molded teeth). A dental appliance or attachment placement structure can, for example, include a negative impression of the dental mold. Such molding techniques can be used to create the dental appliances and attachment placement structures.

Figure 3A:
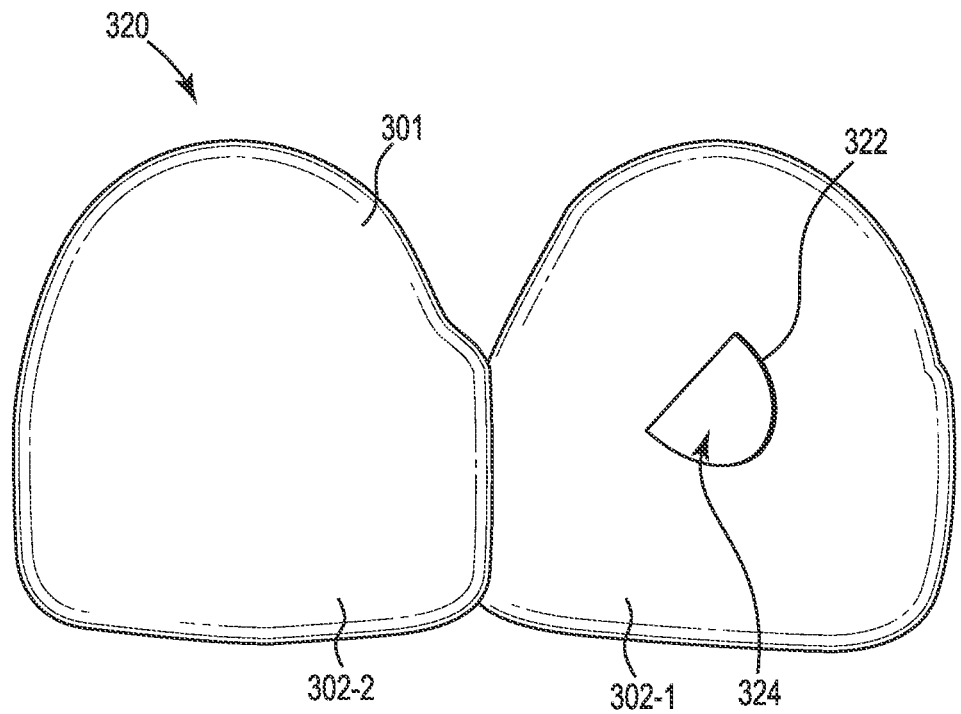
FIG. 3A illustrates a front view of a dental attachment placement structure for etching a tooth according to a number of embodiments of the present disclosure.
Figure 3B:
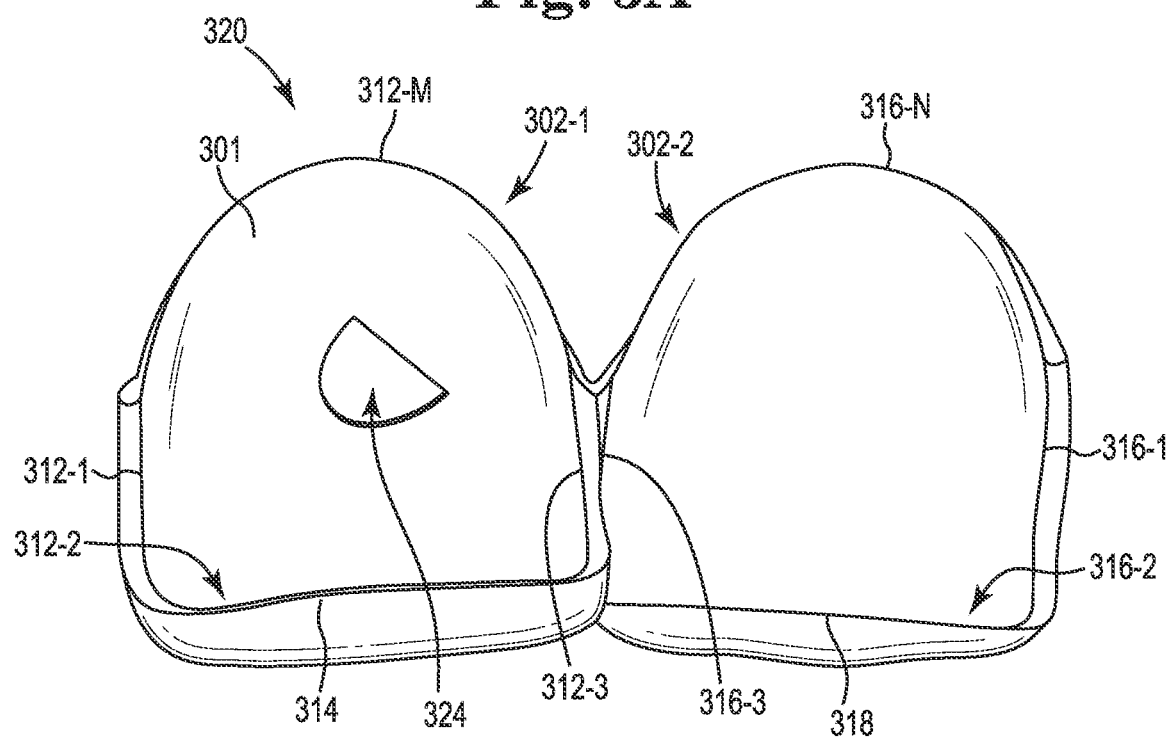
FIG. 3B illustrates a back view of the dental attachment placement structure of FIG. 3A.

FIGS. 3A and 3B illustrate another apparatus embodiment that can be used in the placement of an attachment on the surface of a tooth. FIG. 3A illustrates a front view of a dental attachment placement structure for etching a tooth according to a number of embodiments of the present disclosure. FIG. 3B illustrates a back view of the dental attachment placement structure of FIG. 3A.

In some instances, it may be beneficial to prepare the surface of the tooth for adhering of a dental attachment thereto. It is ideal if the preparation of the surface of the tooth takes place only at the area in which the attachment is to be attached.

Such preparation can include etching of the surface of the tooth which improves the adhesion between the tooth surface and the attachment or adhesive material used to adhere the attachment to the tooth. In embodiments such as that illustrated in FIGS. 3A, 3B, and 4, the dental attachment placement structure can be utilized as an etch mask that allows the etching to occur in the area to which the attachment is to be placed without etching other surfaces not at the attachment area.

Similar to the apparatus of FIG. 1A, in the embodiment of FIG. 3A, the apparatus 320 includes a body 301 having at least one surface shaped to conform to one or more of the contours of an exterior surface of a tooth. The body has multiple surfaces, 302-1 and 302-2, each shaped to conform to the multiple contours of an exterior surface of a tooth, and other surfaces will be discussed in more detail in FIG. 3B.

In the embodiment of FIG. 3A, the body 301 includes an aperture 324 formed in portion 302-1. The aperture 324 has a specific shape 322 that, when the apparatus 320 is placed correctly on the tooth, will allow the attachment area (i.e., the area at which the attachment will be attached) to be etched without etching other areas of the tooth. The structure illustrated in FIG. 3A, allows the treatment professional to place the apparatus 320 onto the teeth of a patient to provide a mask for purposes of etching in a more accurate position and orientation for placement of an attachment (e.g., the shape of aperture 324 would be appropriate for an attachment such as that illustrated in FIG. 1C (106)), with respect to the tooth surface, than previous techniques.

Similar to FIG. 1B, the embodiment illustrated in FIG. 3B includes multiple surfaces that can be used to assist in the alignment of the etch mask with respect to the intended surface of the tooth to which the attachment is to be secured. For example, one or more of surfaces: 312-1, 312-2, 312-3, 312-M, 314, 316-1, 316-2, 316-3, 316-N, 318, and/or inner surfaces of portions 302-1 and/or 302-2 can be utilized in various embodiments of the present disclosure.

In such an embodiment, the surface of the tooth can be etched with an etching material that can, for example be brushed onto the surface of the tooth by the treatment professional through the aperture 324. In the embodiment of FIGS. 3A and 3B, the shape 322 of the aperture 324 is sized and shaped to be as large or slightly larger or smaller than the attachment that is to be placed on the tooth. However, in some embodiments, the size and/or shape of the aperture may be different than the surface of the attachment that is to be placed in the tooth.

When shaped like the surface of the attachment that is to be placed in the tooth the treatment professional can align the shape of the attachment with the shape of the etched area such that the attachment is at the correct location and in the correct orientation with respect to the surface of the tooth. Although a particular attachment shape and aperture shape are illustrated, any suitable attachment shape and corresponding aperture shape can be utilized in the embodiments of the present disclosure.

The present example also includes a portion of the body (e.g., surfaces 212-1, 212-2, 212-3, 212-M, and/or the inner surface of 202-1) having a contour that is shaped to correspond with a contour of an alignment surface of a tooth (e.g., front surface, back surface, side surface, edge surface, etc.) and when the contour of the body and the corresponding contour is aligned, the etching area is located at the particular position.

In another example embodiment, a dental attachment placement apparatus includes a body that has an attachment mounting structure. The body also includes a surface (e.g., surfaces 212-1, 212-2, 212-3, 212-M, and/or the inner surface of 202-1) having a contour that is shaped to correspond with a contour of an alignment surface (e.g., front surface, back surface, side surface, edge surface, etc.) of a tooth and when the contour of the body and the corresponding contour of the tooth are aligned, a dental attachment, when placed in the attachment mounting structure, is located at the particular position with respect to an exterior surface of the tooth.

In some embodiments, the body includes at least a second surface (e.g., inner surface of 102-2) shaped to correspond with a contour of an alignment surface of a second tooth. Further, the body can include a second attachment mounting structure (e.g., as shown in FIGS. 3, 332-1 and 332-P) for attaching a second dental attachment to an exterior surface of the second tooth (e.g., 434-3).

Another example embodiment provides a dental attachment placement apparatus having a body that includes an attachment mounting structure having an aperture that allows an attachment to be placed through the body and onto an exterior surface of the tooth. The body also includes a surface having a contour that is shaped to correspond with a contour of an alignment surface of a tooth and when the contour of the body and the corresponding contour of the tooth are aligned, a dental attachment, when placed in the aperture, is located at the particular position with respect to an exterior surface of the tooth.

As illustrated in FIGS. 1B and 2B, in some embodiments, the body includes multiple surfaces having contours that are shaped to correspond with contours of multiple alignment surfaces of a tooth. In some such embodiments, when the contours of the body and the corresponding contours of the tooth are aligned, they frictionally hold the apparatus in place against the tooth during securement of the attachment. For example, the inner surface of 102-1 and inner surface 114 can engage the corresponding surfaces of the tooth to hold the apparatus in place while the attachment is being placed and/or secured. This can be beneficial as it, for example, can allow the treatment professional to use both hands to address other tasks while the attachment is in position to be secured or is being secured.

Figure 3C:
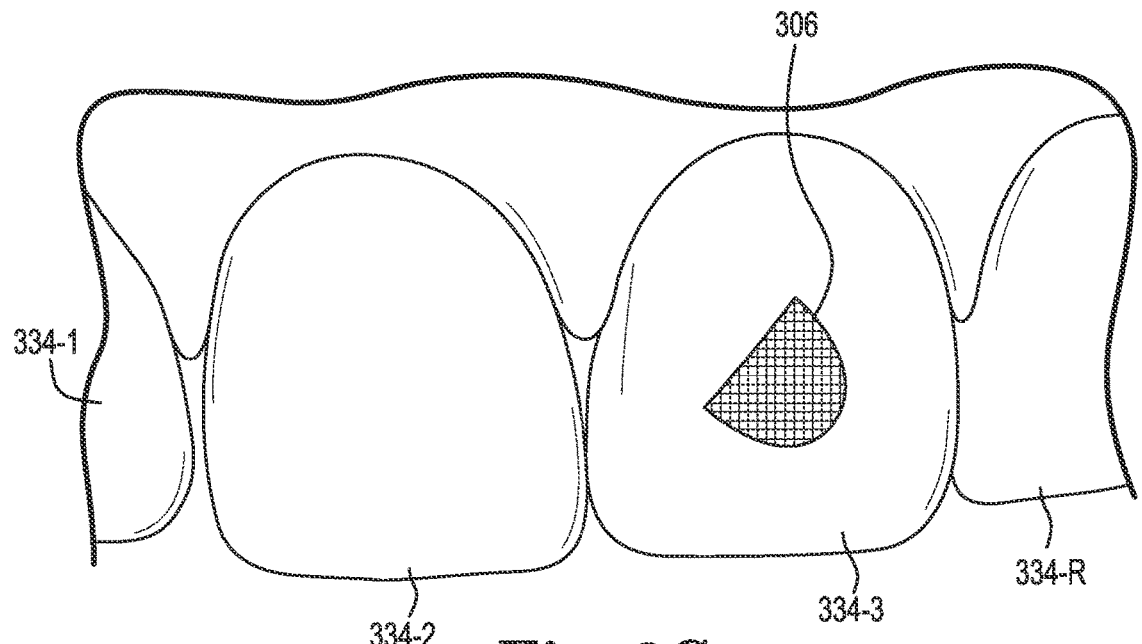
FIG. 3C illustrates a front view of an etched area of a tooth of a patient that has been etched utilizing the dental attachment placement structure of FIGS. 3A and 3B.

In some embodiments, the body can include multiple attachment mounting structures each having an aperture that allows an attachment to be placed through the body and onto an exterior surface of the tooth. For example, in the embodiment shown in FIG. 4, the apparatus 401 includes multiple attachment mounting structures each having apertures (e.g., 432-4 and 432-V) that allows an attachment (406-2 and 406-S) to be placed through the body and onto the exterior surface 436-T of tooth 434-R. FIG. 3C illustrates a front view of an etched area of a tooth of a patient that has been etched utilizing the dental attachment placement structure of FIGS. 3A and 3B. The resultant etched area 306 has been accomplished via the attachment mounting structure illustrated in FIGS. 3A and 3B.

In this manner, the surface of the tooth can be etched at an area that is large enough to secure an attachment, but not un-necessarily large. Also, in this manner, an attachment can be correctly positioned on the surface of tooth 334-3 and oriented such that it can provide the desired force to the teeth of the patient (e.g., 334-1, 334-2, 334-3, 334-R, and/or other teeth of the patient) when combined with the dental appliance that will attach to the attachment.

Figure 4:
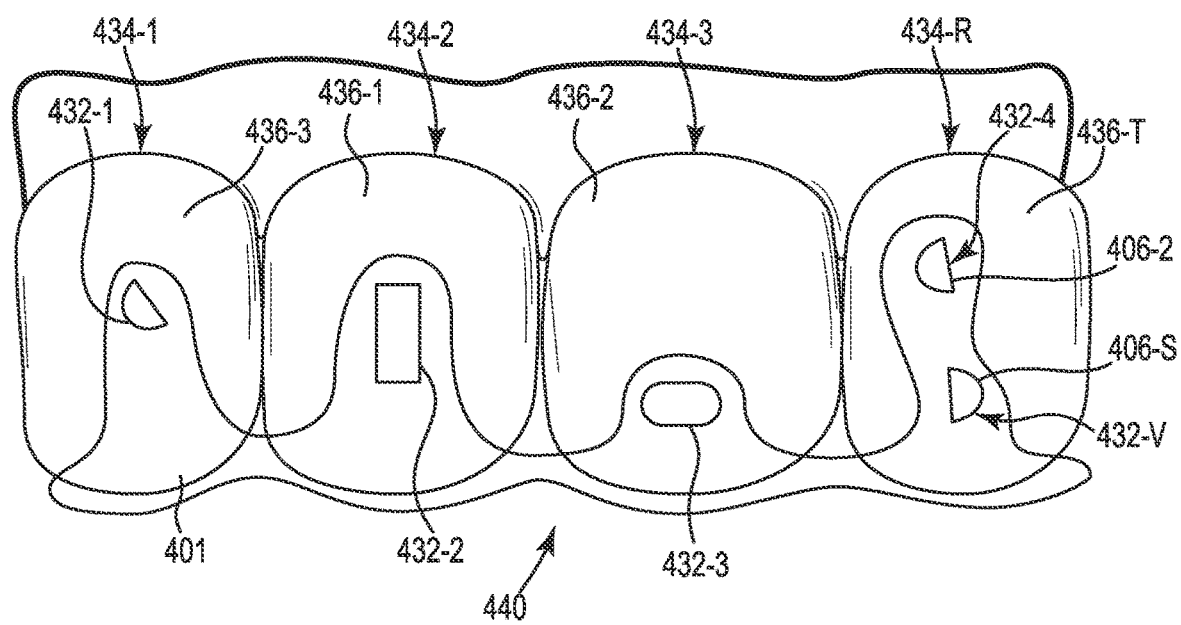
FIG. 4 illustrates a front view of a dental attachment placement structure having multiple attachment placement components provided on the structure according to a number of embodiments of the present disclosure.

FIG. 4 illustrates a front view of a dental attachment placement structure having multiple attachment placement components provided on the structure according to a number of embodiments of the present disclosure. In the embodiment of FIG. 4, the body 401 of apparatus 440 has an attachment mounting structure that includes multiple apertures 432-1, 432-2, 432-3, 432-4, and 432-V that can be used to etch portions of teeth 434-1, 434-2, 434-3, 434-R on surfaces 436-1, 436-2, 436-3, and 436-T.

In order to save fabrication time and materials cost, the apparatus may include multiple etch locations and only some may be used at any given time. In such applications, the apparatus 440 can, for example, be used to etch a location on a tooth at one point in time and can be reused to etch another location on a tooth at another point in time.

Similar to the embodiment of FIG. 2, another feature of the embodiment of FIG. 4, is that in order to save fabrication time and materials cost, an apparatus with less material can be used. In such embodiments, the apparatus can be designed such that a reduced amount or minimized amount of material is used in order to properly etch a surface of a tooth at a desired location.

Figure 5A:
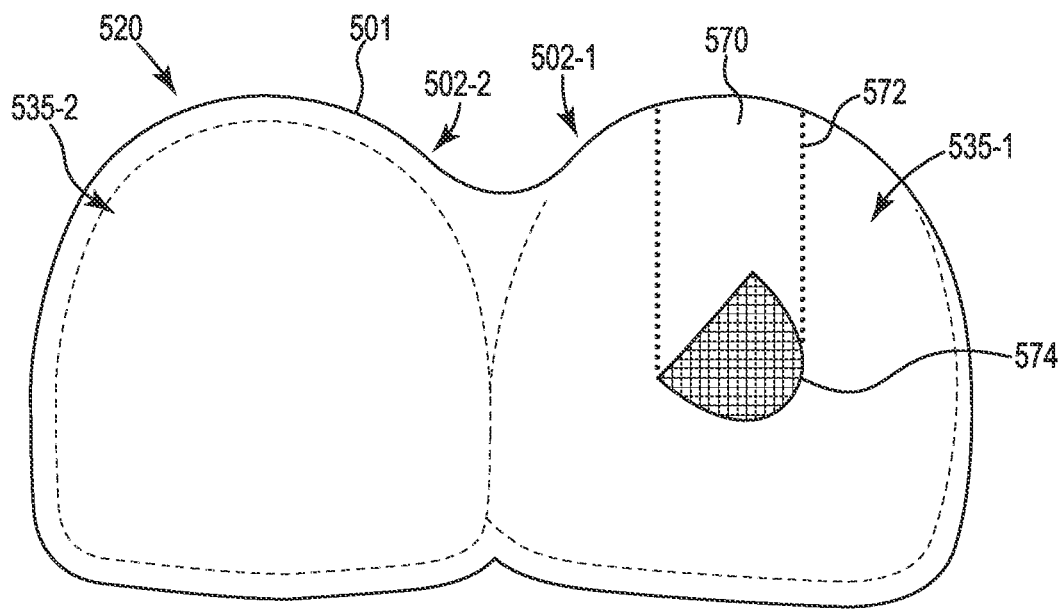
FIG. 5A illustrates a front view of another dental attachment placement structure for etching a tooth according to a number of embodiments of the present disclosure.

FIG. 5A illustrates a front view of another dental attachment placement structure for etching a tooth according to a number of embodiments of the present disclosure. The embodiment of FIG. 5A is similar to that of FIG. 3A.

In the embodiment of FIG. 5A, the apparatus 520 includes a body 501 having at least one surface shaped to conform to one or more of the contours of an exterior surface of a tooth. The body has multiple surfaces, 502-1 and 502-2, each shaped to conform to the multiple contours of an exterior surface of a tooth. Some embodiments may have one or more other surfaces similar to those shown in FIG. 3B to aid in the alignment of the dental attachment placement structure with the tooth. In the example of FIG. 5A, the surface 502-1 is positioned on tooth surface 535-1 and surface 502-2 is positioned on tooth surface 535-2.

In the embodiment illustrated in FIG. 5A, the dental attachment placement structure allows for the surface of the tooth to be etched through the aperture. The etched area is illustrated at 574. Adjacent to the aperture is a releasable portion 570.

The releasable portion can be released by any suitable release mechanism. For example, a series of perforations can be cut into the body 501 to allow the portion 570 to be torn away from the rest of the body 501. This can allow the dental attachment placement structure to also be used as a guide for the placement of an attachment to be placed in the correct position.

For example, once the area is etched as shown in FIG. 5A, an attachment can be secured to the etched area. If an attachment has a surface that is shaped to correspond to the shape of the aperture, then the edges of the aperture can be used as a guide to the correct positioning of the attachment. Once secured, the releasable portion 570 can be removed and the rest of the body 501 can be removed from the teeth while the attachment remains attached to the tooth surface 535-1.

Figure 5B:
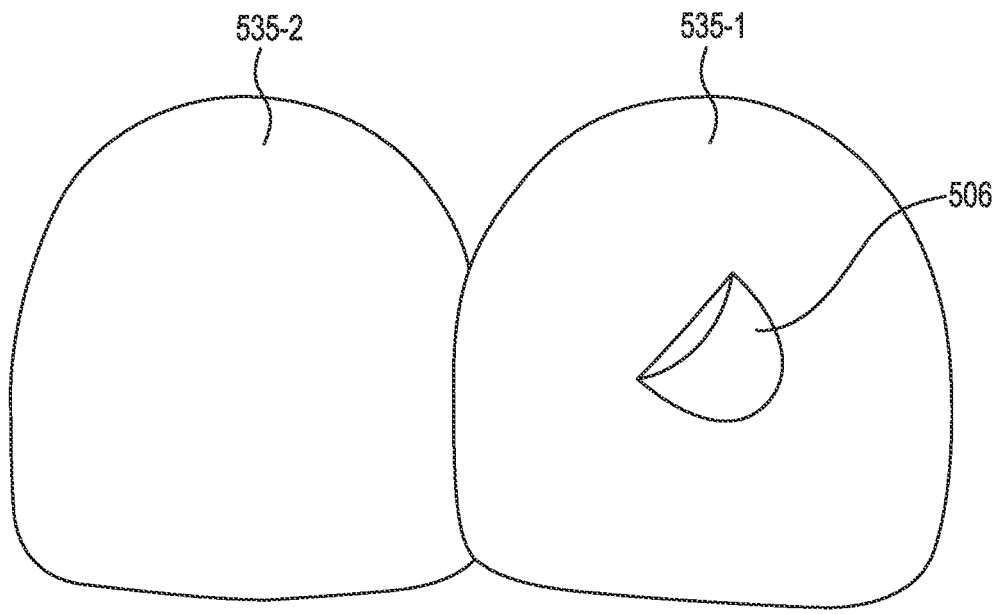
FIG. 5B illustrates front view of a dental attachment attached to a tooth of a patient utilizing the dental attachment placement structure of FIG. 5A.

FIG. 5B illustrates front view of a dental attachment attached to a tooth of a patient utilizing the dental attachment placement structure of FIG. 5A. This figure includes a tooth surface 535-1 of a first tooth and a tooth surface of a second tooth 535-2, and an attachment 506 mounted on the surface 535-1.

As can be seen from this figure, the attachment 506 is positioned and oriented on the surface of the tooth 535-1 in the same position and orientation as the etched area 574, thereby allowing better adhesion of the attachment 506 to the surface of the tooth 535-1. This is because the attachment was placed in the aperture of body 501 while it was positioned on tooth surfaces 535-1 and 535-2, then removed after the attachment 506 was adhered to etched area 574.

Figure 6A:
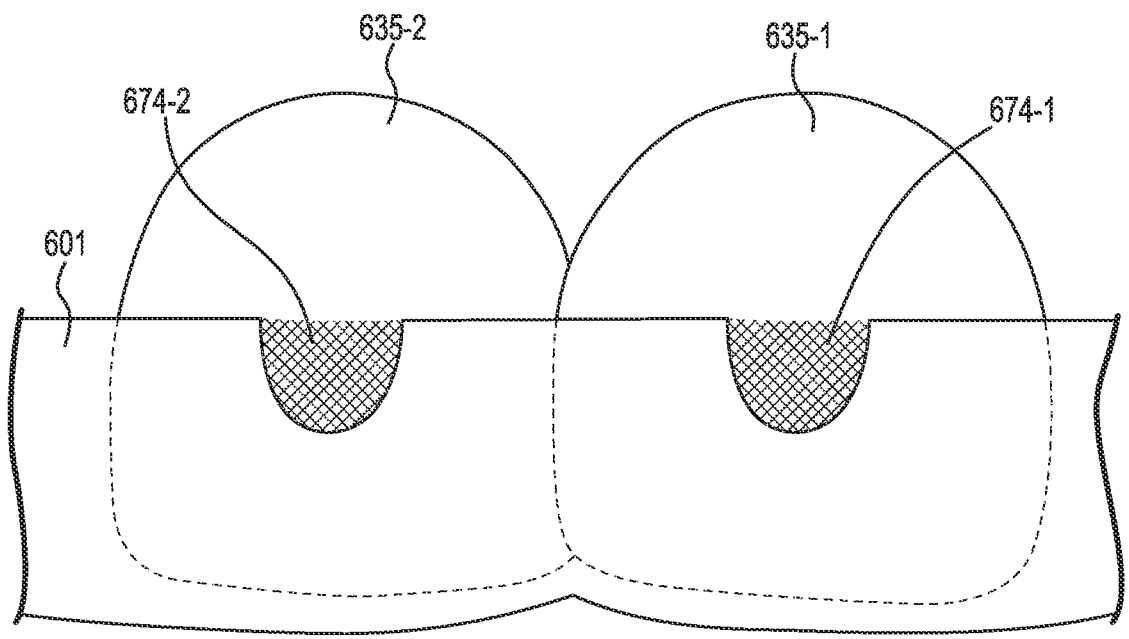
FIG. 6A illustrates a front view of another dental attachment placement structure for etching a tooth according to a number of embodiments of the present disclosure.

FIG. 6A illustrates a front view of another dental attachment placement structure for etching a tooth according to a number of embodiments of the present disclosure. FIG. 6A illustrates an embodiment wherein the body 601 of the dental attachment placement structure has apertures that do not fully surround the area to be etched. In such embodiments, the body can be used as a guide for what area is to be etched (e.g., areas 674-1 and 674-2), and as a guide to placement of one or more attachments (e.g., 606-1 and 606-2), but also allows for removal of the body 601, once the attachment has been secured to the surface of the tooth (e.g., 635-1 and/or 635-2).

Figure 6B:
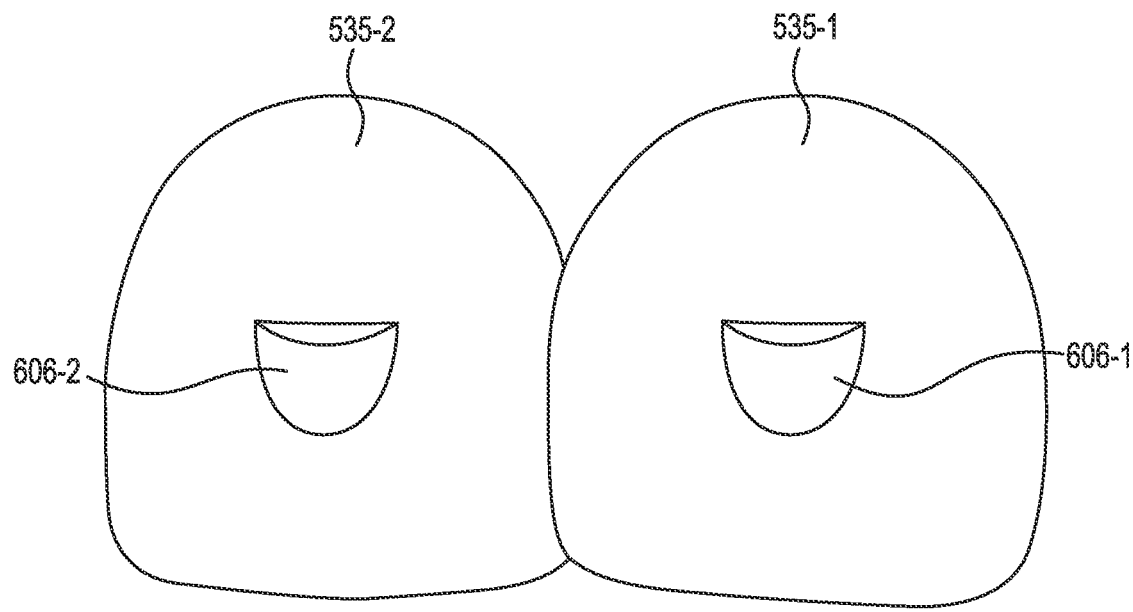
FIG. 6B illustrates front view of multiple dental attachments attached to multiple teeth of a patient utilizing the dental attachment placement structure of FIG. 6A.

For instance, FIG. 6B illustrates front view of multiple dental attachments attached to multiple teeth of a patient utilizing the dental attachment placement structure of FIG. 6A. This figure includes a tooth surface 635-1 of a first tooth and a tooth surface of a second tooth 635-2, and attachments 606-1 and 606-2 mounted on the surfaces 635-1 and 635-2, respectively.

As can be seen from FIG. 6B, the attachments 606-1 and 606-2 are positioned and oriented on the surface of the teeth 635-1 and 635-2 in the same position and orientation as the etched areas 674-1 and 674-2, thereby allowing better adhesion of the attachments 606-1 and 606-2 to the surface of the teeth 635-1 and 635-2. This is because the attachment was placed in the apertures of body 601 while it was positioned on tooth surfaces 635-1 and 635-2, then removed after the attachments 606-1 and 606-2 were adhered to etched areas 674-1 and 674-2.

Figure 7A:
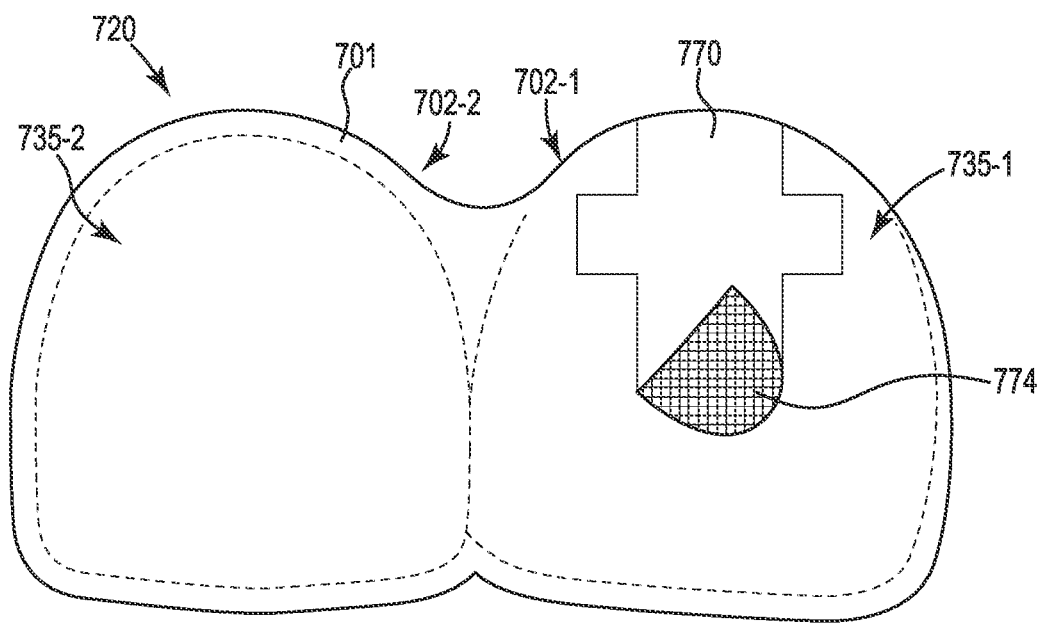
FIG. 7A illustrates a front view of another dental attachment placement structure for etching a tooth according to a number of embodiments of the present disclosure.

FIG. 7A illustrates a front view of another dental attachment placement structure for etching a tooth according to a number of embodiments of the present disclosure. The embodiment of FIG. 7A is similar to that of FIG. 5A.

In the embodiment of FIG. 7A, the apparatus 720 includes a body 701 having at least one surface shaped to conform to one or more of the contours of an exterior surface of a tooth. The body has multiple surfaces, 702-1 and 702-2, each shaped to conform to the multiple contours of an exterior surface of a tooth.

As with other embodiments discussed herein, some embodiments may have one or more other surfaces similar to those shown in FIG. 3B to aid in the alignment of the dental attachment placement structure with the tooth. In the example of FIG. 7A, the surface 702-1 is positioned on tooth surface 735-1 and surface 702-2 is positioned on tooth surface 735-2 to aid in positioning and/or orientation of the dental attachment placement structure with respect to the tooth to which an attachment is to be attached and thereby the positioning and/or orientation of the attachment to the tooth.

In the embodiment illustrated in FIG. 7A, the dental attachment placement structure allows for the surface of the tooth to be etched through the aperture. The etched area is illustrated at 774. Adjacent to the aperture is a removable portion 770.

The removable portion can be held in place by any suitable mechanism. For example, the removable portion can be shaped like a puzzle piece that mates with the rest of the body 701 in a particular orientation based on the removable portion 770 having an irregular shape. As used herein, an irregular shape is a shape that can only be positioned in one way with the rest of the body 501 such that the aperture has a desired shape for etching and/or positioning of an attachment therein. This can allow the dental attachment placement structure to be used for etching of the surface of a tooth and/or to be used as a guide for the placement of an attachment to be placed in the correct position.

For example, once the area is etched as shown in FIG. 7A, an attachment can be secured to the etched area. If an attachment has a surface that is shaped to correspond to the shape of the aperture, then the edges of the aperture can be used as a guide to the correct positioning of the attachment. Once secured, the removable portion 770 can be removed and the rest of the body 701 can be removed from the teeth while the attachment remains attached to the tooth surface 735-1.

In some embodiments, the edges of the removable portion and the edges on the body that correspond to the edges of the removable portion can be slanted such that when the removable portion is positioned into the rest of the body, it can be held in place. This can allow the treatment professional the ability to use their hands to do other things without having to hold the removable portion in place.

Also, in embodiments such as that shown in FIG. 7A, the apparatus can be positioned to accomplish etching (with the removable portion in place). The removable portion can be removed once the etch material and has been applied. Then, the removable portion can be repositioned with the rest of the body for securing of an attachment to the tooth. Once the attachment is secured to the tooth, the removable portion can be removed again to allow for removal of the apparatus for the patient's mouth without having to pull a portion of the apparatus over the attachment.

Figure 7B:
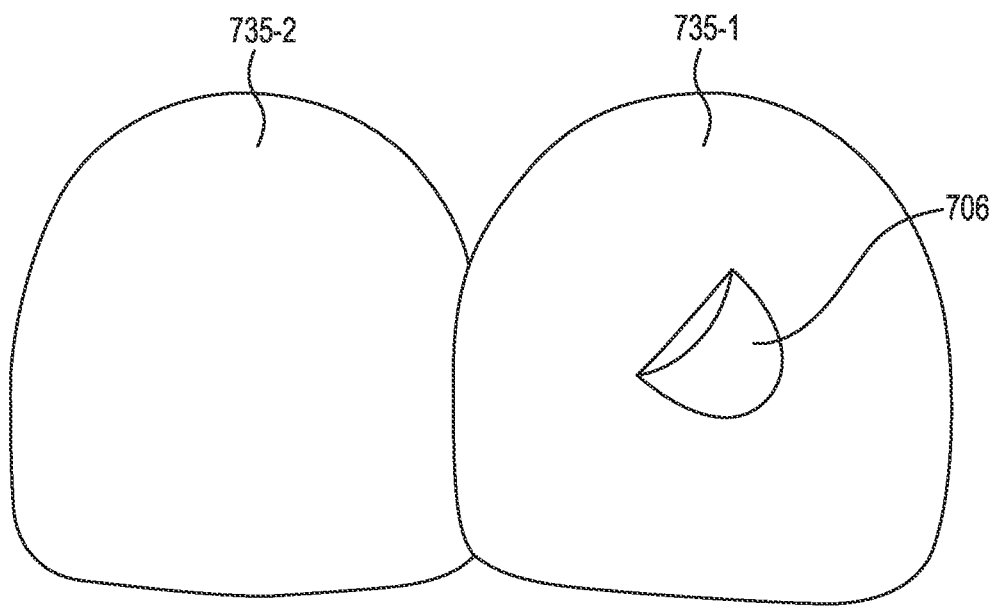
FIG. 7B illustrates front view of a dental attachment attached to a tooth of a patient utilizing the dental attachment placement structure of FIG. 7A.

FIG. 7B illustrates front view of a dental attachment attached to a tooth of a patient utilizing the dental attachment placement structure of FIG. 7A. This figure includes a tooth surface 735-1 of a first tooth and a tooth surface of a second tooth 735-2, and an attachment 706 mounted on the surface 735-1.

As illustrated in this figure, the attachment 706 is positioned and oriented on the surface of the tooth 735-1 in the same position and orientation as the etched area 774, thereby allowing better adhesion of the attachment 706 to the surface of the tooth 735-1. As with the embodiment of FIGS. 5A and 5B, this is because the attachment was placed in the aperture of body 701 while it was positioned on tooth surfaces 735-1 and 775-2, then removed after the attachment 706 was adhered to etched area 774.

FIGS. 8A-10C provide three embodiments that each include different support structures that make the connection between the body of the dental attachment placement structure and the attachment. These embodiments may each have benefits for some implementations and those differences and their benefits are discussed below.

As shown and described in the embodiments of FIGS. 8A-10C, the attachment is located within an aperture and the dental attachment placement structure includes at least one support connecting the attachment to the body. As can be seen from the embodiment of FIG. 8C, the attachment 806 can be connected to the one or more supports 808. The direct connection can be arched as shown to reduce or eliminate contact of the support to the surface of the tooth.

Such an arch may be beneficial, for example, because the treatment professional may not have to maneuver a detachment tool as close to the tooth as an embodiment where the support or the connection between the support and the attachment touch the tooth surface. In some such embodiments, the support can be connected to the attachment such that it can be released from the attachment.

For example, in some embodiments, the junction between the attachment and the support can include a feature to assist in the detachment of the attachment from the support. This feature can be located at or near the transition between the support material and the attachment material.

The feature can, for example, be a physical feature provided at the junction, such as one or more perforations, a portion that is thinner than the rest of the support and/or attachment, or a different material than the attachment and/or the support, among other attachment separation structures discussed herein. The feature can also be the use of a particular material at the junction that allows for a stimulant to be applied to that material that allows the attachment to be more easily removed. Such materials could, for example, make the material more brittle, thereby allowing it to be more easily broken, or cause the material to dissolve or disintegrate. Examples, of stimulants include wavelengths of light, such as UV, or chemical materials that cause the above affects based on interaction with the support material at the junction between the attachment and the one or more supports.

Once the attachment 806 is separated from the body 801, the attachment will remain on the tooth (e.g., attachment is affixed via adhesive to the surface of the tooth) during a portion or all of one or more treatment periods and the dental attachment placement structure body will be removed from the teeth of the patient. For example, this can be accomplished by lifting parts of the body over the attachment or by cutting/breaking the body into pieces and removing it in that manner.

The embodiment also includes a dental attachment placement structure, connected to a dental attachment to hold the attachment in a particular position. A portion of the body has a contour that is shaped to correspond with a contour of an alignment surface of a tooth such that when the contour of the body and the corresponding contour of the tooth are aligned, the aperture is located over the particular position on the surface of the tooth.

The attachment placement surface can include the portion of the body that is shaped to conform to corresponding contours of an alignment surface of the tooth. As stated herein, the alignment surface of the tooth is any shape on the surface of the tooth that can be used in connection of the attachment placement surface to more precisely position an attachment in the surface of the tooth. In this manner, when the contour of the body and the corresponding contour of the tooth are aligned, the aperture is located over the particular position in three dimensions on the surface of the tooth. For example, a ridge on the tooth can mate with a corresponding, but complementary surface of the attachment placement surface.

In some embodiments, a dental attachment placement structure, can include a body that includes a dental attachment placement structure, connected to a dental attachment to hold the attachment in a particular position, the body also can include a surface having a contour that is shaped to correspond with a contour of an alignment surface of a tooth. As used herein, an alignment surface of a tooth is any surface that when mirrored in the shape of a corresponding surface on the body can be used to properly locate the body with respect to the tooth. For example, when the contour of the body that mirrors the contour of the tooth and the corresponding contour of the tooth are aligned, a dental attachment, when placed in the attachment mounting structure, is located at the particular position with respect to an exterior surface of the tooth. Examples, of alignment surfaces on a tooth include: a ridge on a front surface of a tooth, a valley in a front surface, an edge of a tooth, a corner of a tooth, a contour of the gingival line of a tooth, a ridge or valley on a back surface of a tooth, among other such features that can be used to more precisely locate the dental attachment placement structure in relation to the tooth to aid in the correct placement of the attachment.

As discussed elsewhere in the specification the body can include at least a second surface shaped to correspond with a contour of an alignment surface of a second tooth. Such additional surfaces allow for greater accuracy in the placement of the attachment.

Figure 8A:
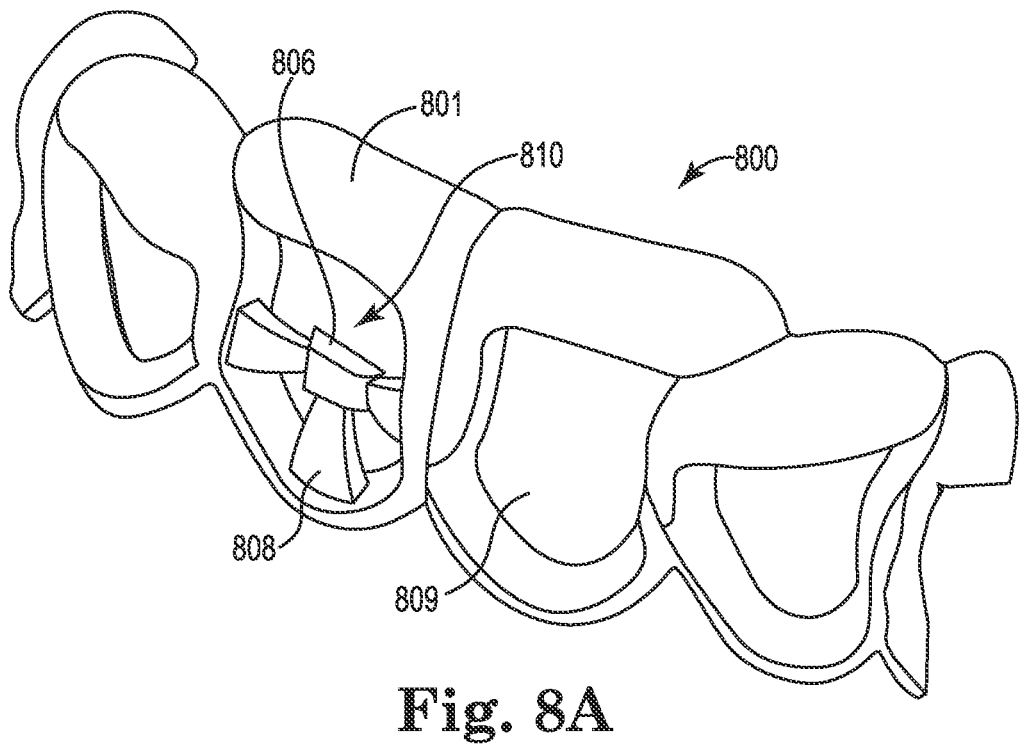
FIG. 8A illustrates an angled front view of a dental attachment placement structure having an attachment placement component provided on the structure according to a number of embodiments of the present disclosure.

FIG. 8A illustrates an angled front view of a dental attachment placement structure having an attachment placement component provided on the structure according to a number of embodiments of the present disclosure. conforming to the surface of the tooth and that there is a top surface In the view of FIG. 8A, an attachment placement structure that conforms to the front surfaces of a tooth at a top of the tooth, sides of the tooth and bottom of the tooth (along the gingival line of the tooth). The illustrated structure is shown for a lower jaw, but such embodiments are not limited to use with the lower jaw. The attachment placement structure 800 of FIG. 8A includes a body 801 having several tooth shaped portions, at least one of those portions having an attachment 806 connected thereto by a number of supports 808, the supports separated by one or more apertures 810.

FIG. 8A shows the attachment 806 attached to the body 801 by three supports 808. One feature of the supports shown in FIG. 8A, is that they are arched along their direction of elongation. This feature can allow the surface of the supports that is closest to the tooth to be a distance that is further away from the tooth than the surface of the attachment that is closest to the tooth (the surface of the attachment that is to be attached to the tooth).

This can be beneficial for a number of reasons. For example, being farther away from the tooth reduces the potential for the support to be adhered to the tooth by stray adhesive that has leaked from between the tooth and the attachment during the securing process or that was sloppily applied during application of the adhesive to the surface of the attachment.

Additionally, the spaced nature of the arched support from the tooth may also allow separation of the attachment from the supports in a manner that reduces the potential for damage of the tooth during separation. For example, if the support is to be cut away from the attachment to form the separation, the tip of the cutting device may have space to pass between the support and the tooth during separation where there would be no space if the support were in contact with the tooth.

Further, as can be seen in the embodiment of FIG. 8A, the support can be tapered from a first thickness at its connection to the body 801 to a second, thinner thickness at its connection to the attachment 806. This can be beneficial in various ways. For example, the thinned connection at the attachment end of the support allows more space for a separation tool to be placed, while the thicker end allows a more stable and substantial support member during positioning and separation.

This can be beneficial in that when the structure is placed on the teeth of the patient, force may be applied to the supports and the thicker portion can resist the potential for the support to break during the placement of the structure. This could affect the positioning of the attachment or render the dental attachment placement structure ineffective to assist in placement of the attachment (e.g., the structure may not be able to hold the attachment in proper position for attachment at the correct location or orientation).

The tapering also makes separation of the attachment from the dental attachment placement structure body easier. For example, when a cutting tool is used to separate the attachment from the body, it must cut completely through the support to accomplish the separation.

A thinner support means that less cutting needs to be done. Furthermore, a tapered support may negate the need for a cutting tool and separation of the attachment from the support may only require the user to apply a compressive or tensile force on the thinner support end to initiate the break. Additionally, when the separation between the body and the attachment is accomplished, there may be a little of the support material still attached to the attachment (e.g., if the treatment professional did not cut exactly at the junction between the attachment and the support).

This may leave non-biocompatible material on the attachment and may make the attachment not fit with the dental appliance that is placed over the attachment (the attachment is a different shape in one or more dimensions than the cavity into which the attachment is to be placed). By using a thinner support end at the junction between the attachment and the support, the likelihood that extra support material is left on the attachment is reduced.

The illustration of the embodiment in FIG. 8A also shows that the body may not cover the entire front surfaces of the teeth adjacent to the tooth on which the attachment 806 is to be affixed. For example, an aperture 809 may be formed in the body over a portion that would cover a part of the adjacent tooth.

Having more or less material on the adjacent tooth surfaces provides several benefits and these can be weighed when designing various implementations. For example, having more material will increase the strength of the body which may be beneficial in some implementations, such as where the installation of the dental attachment placement structure may be difficult.

Having more material will increase the rigidity of the body which may be beneficial in some implementations, such as where accurate positioning is important. Further, having used less material for the body may be beneficial for reasons of reducing weight of the structure, reducing cost of manufacture as less materials and time may be used, and improving flexibility of the structure to aid in removal, among other benefits.

Figure 8B:
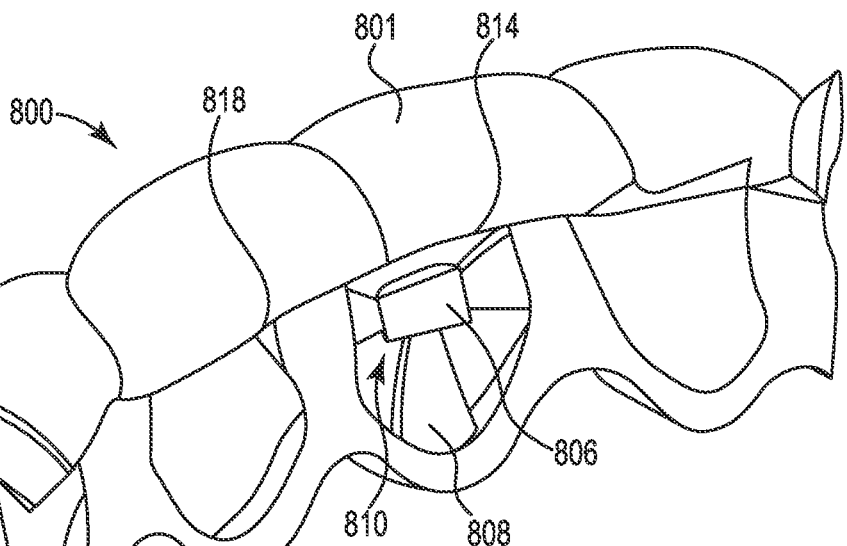
FIG. 8B illustrates an angled back view of the dental attachment placement structure of FIG. 8A.

FIG. 8B illustrates an angled back view of the dental attachment placement structure of FIG. 8A. In this view, the body 801 of the structure 800 has a number of tooth cavities for the placement of a tooth therein. In the example of FIG. 8B, four cavities are shown, however, embodiments are not limited to four teeth and more or less tooth cavities can be provided in various embodiments.

Each cavity is formed from a number of surfaces of the structure that are used to contact a corresponding surface of the tooth onto which the cavity is placed. As shown in FIG. 8A, those surfaces may represent complete surfaces of a tooth or parts of such surface (e.g., the aperture 809).

The apparatus includes a body 801 having a tooth-shaped surface that is shaped to conform to the front surface of a tooth and is to be placed against the front surface of the tooth. This tooth-shaped surface of the body can include an aperture (e.g., aperture 810) to allow placement of an attachment at a particular position on the tooth surface. It will be understood that, in some embodiments, the aperture may not be completely closed around its edge. Such designs should be considered to be within the embodiments of the present disclosure.

As shown in FIG. 8A, FIG. 8B also shows the apertures 810 that provide spaces between the supports 808. In the embodiment of FIG. 8B, the structure also includes a first back side portion 814 that conforms to the back side of the first tooth and a second back side portion 818 that conforms to the back side of the second tooth. As will be discussed with respect to FIG. 8C, a surface of the structure may also be used in conjunction with the biting surface of a tooth for improving the alignment of the attachment prior to affixing it to the tooth.

Also, it should be noted by the reader that the surface on which the line for element number 806 is positioned is the surface on the attachment that is to be attached to the tooth. It is on this surface that an adhesive material is to be placed (the adhesive is not shown). The adhesive can be applied to the entire surface or to a part thereof. The adhesive can be ultra-violet (UV) curable adhesive or any other suitable type of adhesive that can be used to affix the attachment to the tooth surface.

In some embodiments, the attachment can, for example, include an adhesive layer positioned to secure the attachment to an affixing surface of a tooth. In some embodiments, the adhesive is only located on the portion of the attachment that will contact the tooth. In this manner, it is unlikely that the adhesive will secure other parts of the apparatus to the tooth or create excess dried adhesive that may need to be removed from the tooth.

In some embodiments, the surface of the attachment that contacts the tooth may contain a recessed well or pocket in which an adhesive can be applied. This controls the location of where the adhesive is applied and avoids issues surrounding excess adhesive, for example, unwanted flash, unwanted adherence of the positioning structure supports to the tooth.

In some implementations, a release layer is provided over the adhesive. The release layer can be a thin film of plastic, wax paper, or other suitable covering that can be removable by the treatment professional when it is time for the attachment to be placed on the tooth of the patient. This can be beneficial, for example, to allow the adhesive to be applied at or shortly after fabrication of the apparatus, does not expose the adhesive to contaminants that may harden or make the adhesive less effective (e.g., dust).

The use of surfaces (e.g., 814, 818, and/or 812 of FIG. 8C) in conjunction with other surfaces can also allow for use of the corners of one or more teeth to be used to aid in positioning and/or orientation of an attachment. The use of corners can be beneficial in that they can be used to control the positioning of the attachment in more axes of movement than use of the edge surfaces of a tooth.

Figure 8C:
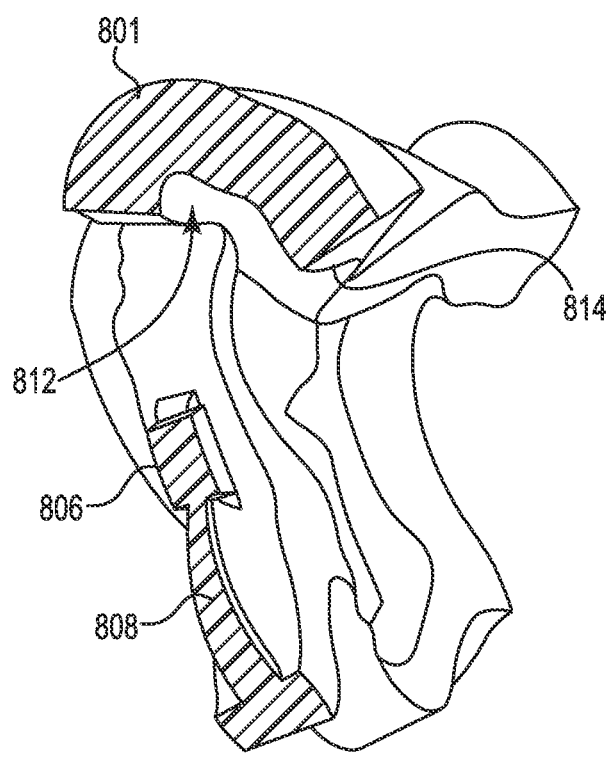
FIG. 8C illustrates a cutaway side view of the dental attachment placement structure of FIG. 8A.

FIG. 8C illustrates a cutaway side view of the dental attachment placement structure of FIG. 8A. FIG. 8C provides a view of the shape of the cavity described above as well and more detail regarding the supports 808 and attachment 806 and their connection.

As discussed above with respect to FIG. 8B, the cavity for placement of a tooth is formed from a number of surfaces of the body 801 of the structure. For example, the cavity, in the embodiment of FIG. 8A-8C is formed from the inside surface that conforms to the front side of the tooth (e.g., buccal side), a surface 812 that contacts and wraps around the tooth's incisal edge (top surface of the tooth in this embodiment, but may be bottom surface, if the structure is designed for the upper jaw), and surface 814 that conforms to the back side of the tooth (e.g., lingual side). In this manner, the three surfaces, when in contact with the tooth, can provide more precise locating of the attachment for placement on the tooth.

Figure 9A:
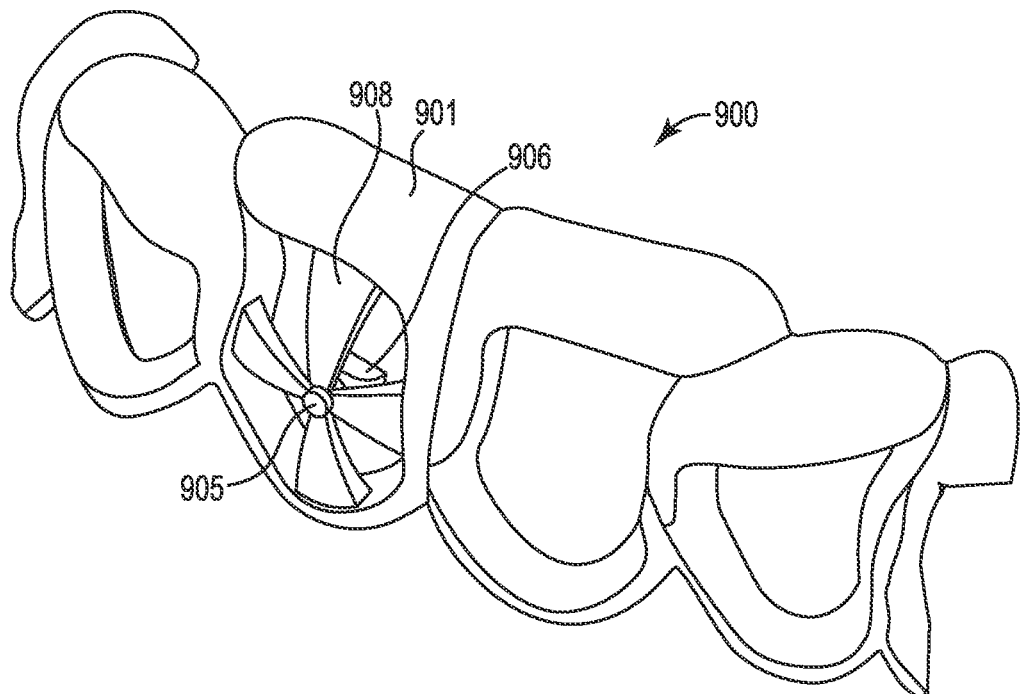
FIG. 9A illustrates an angled front view of a dental attachment placement structure having an attachment placement component provided on the structure according to a number of embodiments of the present disclosure.
Figure 9B:
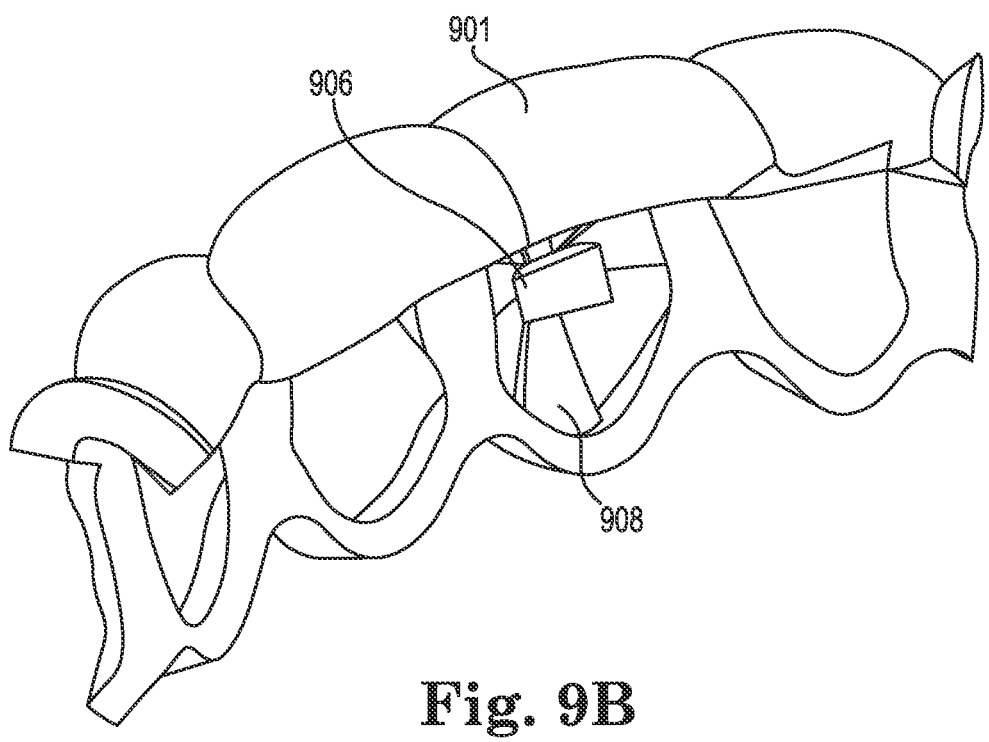
FIG. 9B illustrates an angled back view of the dental attachment placement structure of FIG. 9A.

FIG. 9A illustrates an angled front view of a dental attachment placement structure having an attachment placement component provided on the structure according to a number of embodiments of the present disclosure. FIG. 9B illustrates an angled back view of the dental attachment placement structure of FIG. 9A.

In FIGS. 9A and 9B, the structure 900 includes an attachment 906 that is connected by a single connection member 905 to four supports 908 that are connected to the body 901. In this type of embodiment, the connection that is severed to detach the appliance from the rest of the dental attachment placement structure offers several benefits.

For example, the connection is a single connection allowing the detachment to be made with only one breaking of the connection with the attachment. Also, with a single connection, any residual material from the single connection member is located in one area of the attachment making removal of the extra material easier.

Figure 9C:
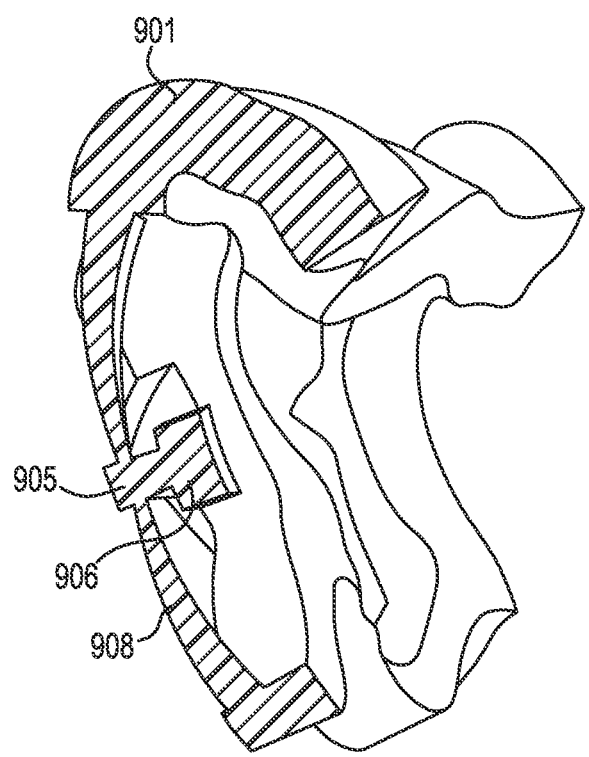
FIG. 9C illustrates a cutaway side view of the dental attachment placement structure of FIG. 9A.

Additionally, in the embodiment shown in FIGS. 9A-9C, the connection is at the top of the attachment which makes detachment and removal of any excess material easier as the connection area is away from the surface of the tooth and more easily accessible. In addition, only one surface of the attachment is affected by the presence of these supports, therefore preserving the integrity of all other attachment surfaces. This is important as these surfaces play a critical role in the orthodontic treatment and require a high degree of dimensional accuracy.

Any suitable number of supports can be utilized. For example, in FIGS. 9A-9C four supports 908 are used, but in other embodiments, for example, those shown in FIGS. 8-A-8C and 10A-10C, other numbers of supports are provided.

In some embodiments, the support functionality can be provided by a material that spans across at least part of the area covering the front surface of tooth. In such an embodiment, the attachment can be attached to the material or to one or more connection members such as the type shown at 905 in FIG. 9A.

In such embodiments, the material may, for example, be cut away to allow access to the connection between the connection member and the attachment in order to detach the attachment. In some embodiments, a stimulant that can be applied as discussed above. In such embodiments, the stimulant can be used, for example, to make the material (or a portion thereof) and/or connection member brittle or dissolve the material and/or connection to detach the attachment therefrom.

FIG. 9C illustrates a cutaway side view of the dental attachment placement structure of FIG. 9A. FIG. 9C, provides a better view of the single connection member 905 that connects the attachment 906 to the supports 908. As shown in FIGS. 9A-9C, in some embodiments, there is a single connection area between the attachment and the attachment placement structure. As stated herein, this, for example, allows the attachment to be separated from the rest of the apparatus more easily and/or with less potential for damage to the tooth or attachment during the separation process.

Figure 10A:
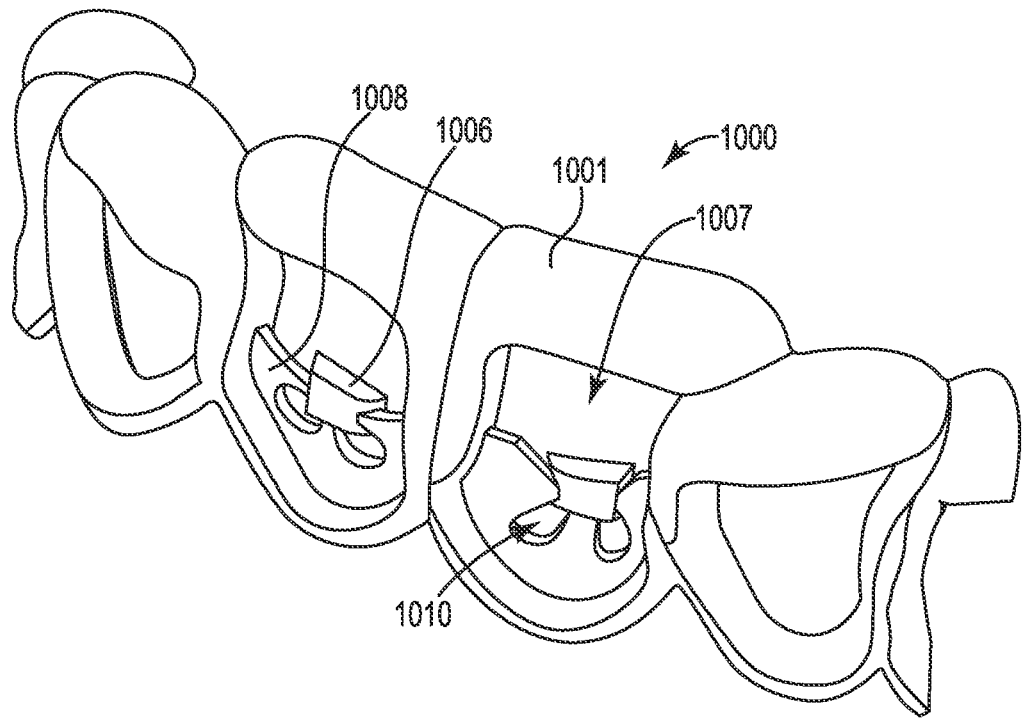
FIG. 10A illustrates an angled front view of a dental attachment placement structure having an attachment placement component provided on the structure according to a number of embodiments of the present disclosure.
Figure 10B:
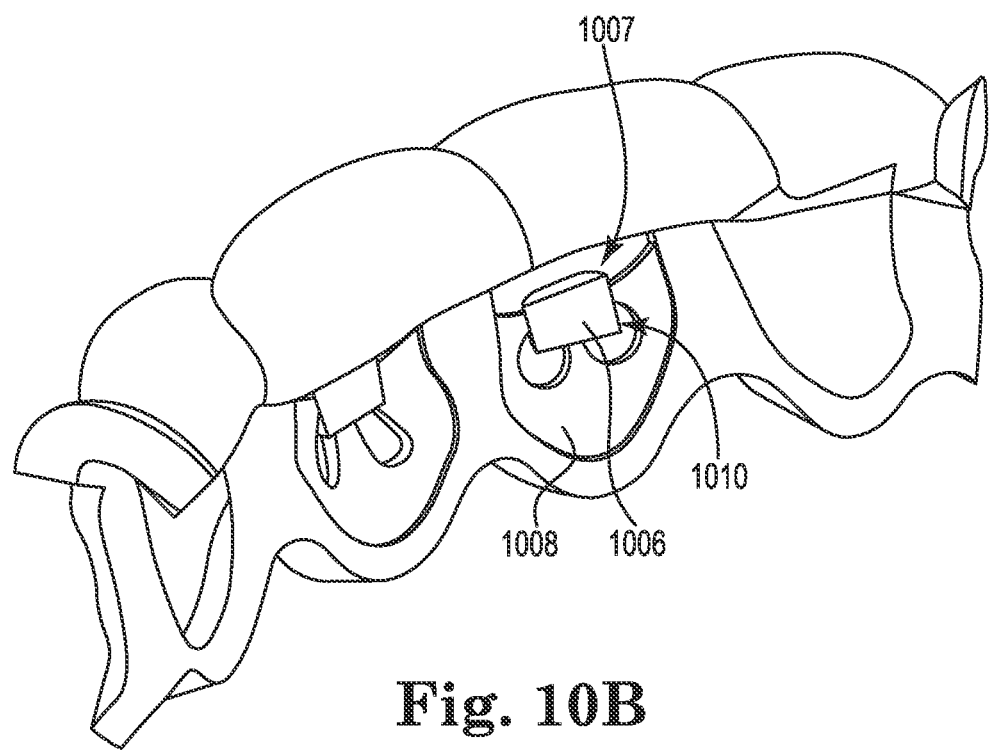
FIG. 10B illustrates an angled back view of the dental attachment placement structure of FIG. 10A.

FIG. 10A illustrates an angled front view of a dental attachment placement structure having an attachment placement component provided on the structure according to a number of embodiments of the present disclosure. FIG. 10B illustrates an angled back view of the dental attachment placement structure of FIG. 10A.

As shown in the embodiment illustrated in FIGS. 10A and 10B, at least one of the attachment mounting structures can have a support connected between the body and a dental attachment. In this manner the supports can be cut instead of a solid layer of material thereby making it easier to release the attachment from the rest of the apparatus.

For instance, in FIGS. 10A and 10B, the supports, that connect the attachment 1006 to the body 1001 of the structure 1000, can be formed individually or can be formed as a sheet of material and then apertures, such as apertures 1010 can be formed in the sheet of material. This sheet of material can be formed with the body 1001 or can be attached to the body after fabrication. The support structure can be fabricated as shown in FIGS. 10A and 10B or can be fabricated to fill the entire inside area of inside shape of the tooth of the body 1001 and then a part of the support can be removed to form aperture 1007.

The body can also include an additional attachment mounting structure (e.g., a second attachment mounting structure) for attaching one or more dental attachments to an exterior surface of another tooth. This allows further elements of the patient's mouth to be used to further corroborate the position of the appliance. This is, for example, because the surfaces and edges of the apparatus when they contact the mouth of the patient, at surfaces and edges of the tooth or teeth that those surface and/or edges of the apparatus.

For example, as shown in FIGS. 10A and 10B, more than one attachment can be provided on the structure for attachment to a user's teeth. In such embodiments, the supports can be the same type of configuration, as shown with respect to supports 1008 in FIG. 10A, or can be different types of configurations (e.g., a support type from 8A-8C could be utilized, and/or from another embodiment shown herein).

Figure 10C:
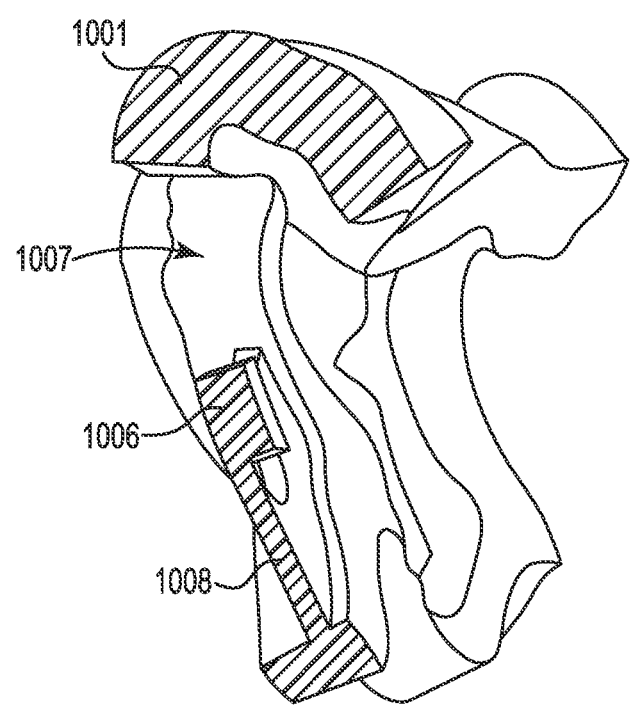
FIG. 10C illustrates a cutaway side view of the dental attachment placement structure of FIG. 10A.

In some embodiments, having more support material (e.g., the support structure of FIGS. 10A-10C compared to the thinner supports of FIGS. 8A-8C) may provide benefits in certain implementations. For example, a more stable structure may provide for better positioning of the attachment, due to its rigidity or other characteristics.

FIG. 10C illustrates a cutaway side view of the dental attachment placement structure of FIG. 10A. FIG. 10C better shows the arrangement of the support structure 1008 and the aperture 1007 formed with respect to the attachment 1006 and body 1001. In this embodiment, the support structure is not arched, which may be easier to manufacture, among other benefits, and its connections to the attachment 1006 are away from the surface that will contact the tooth of the patient. As stated elsewhere, this may be beneficial in allowing for easier detachment of the attachment 1006 from the support structure 1008 and less potential for damaging the tooth during the detachment process, among other benefits.

In one method of forming a structure as discussed in embodiments disclosed herein, the method includes forming an attachment out of an attachment material and a dental attachment placement structure body, connected to the attachment to hold the attachment in a particular position wherein there is a single connection area between the attachment and the attachment placement structure. In some embodiments, the dental attachment placement structure can be printed using the three-dimensional printing apparatus.

Another strategy method can include printing the dental attachment placement structure out of a second material that is different than the attachment material. Such embodiments can be beneficial in several ways. For example, the body can be made from a material that is easier to break, thereby making the separation occur on the body rather than on the attachment (which could deform the attachment in a manner that would make it unusable). The body material could also be made from a less expensive material or a non-biocompatible material (it could be compatible for the short time it is in the mouth of the patient, but may not be biocompatible over the course of a longer period, such as the treatment period).

In some embodiments, printing the attachment and dental attachment placement structure is done such that they are connected to each other at at least one point when printed. For instance, the attachment is connected by three points in FIGS. 8A-8C, one point in FIGS. 9A-9C, and three points in FIGS. 10A-10C.

In another method of forming a dental attachment placement structure, the method includes receiving dental data of a patient's teeth to form a virtual dental model of a patient's dentition. From this dental data, a treatment plan for moving one or more of a patient's teeth, that includes the use of at least one attachment that is affixed to a tooth of the patient, can be created.

In this treatment planning process, the process further includes, locating a position and orientation of an attachment on the surface of a tooth of the patient. Then, a dental attachment placement structure can be designed, including a body, a number of supports, and an attachment connected to the number of supports, wherein the shape of the body is based on the virtual dental model.

In various embodiments, the attachment can be printed to include one surface of the attachment with a contour that will mate with a corresponding contour of an exterior surface of a tooth. In this manner, the attachment can be fitted closely to the surface of the tooth which may increase its ability to be secured to the surface of the tooth. In such implementations, more force may be applied to the attachment without it coming loose from the surface of the tooth, among other benefits.

Some embodiments can provide printing one surface of the dental attachment placement structure with a contour that will mate with a corresponding contour of an exterior surface of a tooth. Such embodiments may be able to more accurately place the attachment on the tooth surface due to the mating nature of the surface of the structure and the tooth surface, among other benefits.

As shown in FIG. 8C, for example, in some embodiments, the dental attachment placement structure includes printing multiple surfaces of the dental attachment placement structure having contours that will mate with corresponding contours of exterior surfaces of one or more teeth. As stated elsewhere herein, the more surfaces that can be used to align the placement structure with respect to the tooth on which the attachment is to be applied, the more accurate the placement of the attachment should be.

As can be appreciated by the discussion of these different embodiments, in can be noted that each of these types of attachment mounting structures can provide an accurate mechanism for positioning and orienting the attachment with respect to the surface of the tooth to which the attachment is to be secured, but one type may have benefits over another in some applications based on one or more characteristics (e.g., whether etching is desired, space available for placement of the attachment, number of attachments to be placed on a single tooth, type of securement that will be used, etc.).

Figure 11:
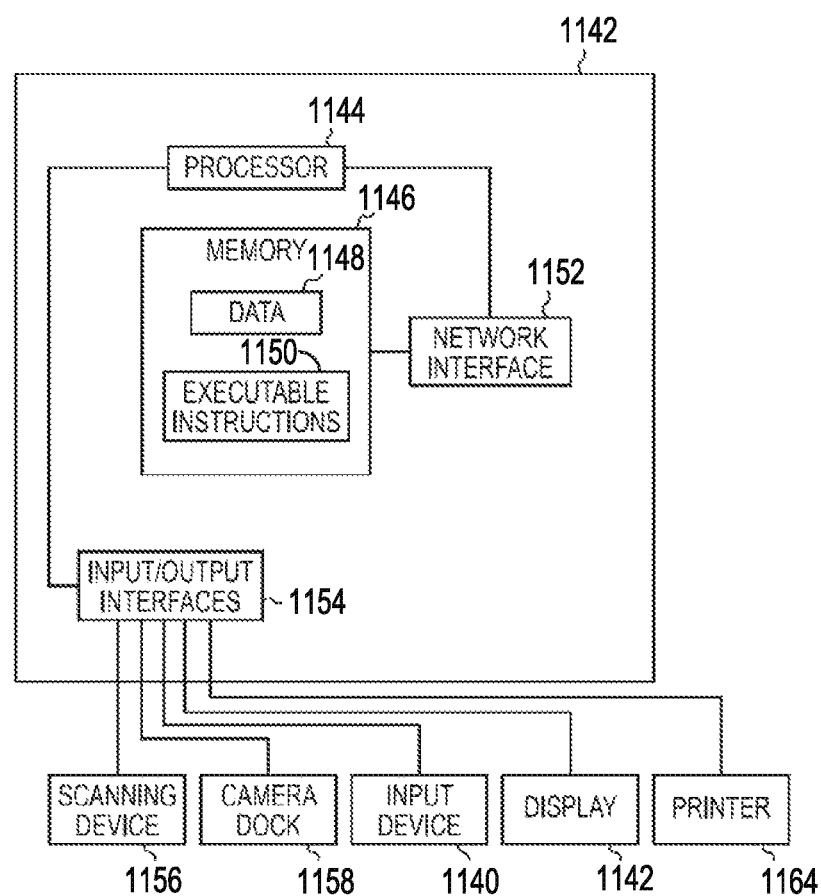
FIG. 11 illustrates a computing device that can be utilized according to one or more embodiments of the present disclosure.

FIG. 11 illustrates a computing device that can be utilized according to one or more embodiments of the present disclosure. For instance, a computing device 1142 can have a number of components coupled thereto.

The computing device 1142 can include a processor 1144 and a memory 1146. The memory 1146 can have various types of information including data 1148 and executable instructions 1150, as discussed herein.

The processor 1144 can execute instructions 1150 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 1146 and/or the processor 1144 may be located on the computing device 1142 or off of the computing device 1142, in some embodiments. As such, as illustrated in the embodiment of FIG. 11, the computing device 1142 can include a network interface 1152. Such an interface 1152 can allow for processing on another networked computing device, can be used to obtain information about the patient, and/or can be used to obtain data and/or executable instructions for use with various embodiments provided herein.

As illustrated in the embodiment of FIG. 11, the computing device 1142 can include one or more input and/or output interfaces 1154. Such interfaces 1154 can be used to connect the computing device 1142 with one or more input and/or output devices 1156, 1158, 1140, 1142, 1164.

For example, in the embodiment illustrated in FIG. 11, the input and/or output devices can include a scanning device 1156, a camera dock 1158, an input device 1140 (e.g., a mouse, a keyboard, etc.), a display device 1142 (e.g., a monitor), a printer 1164, and/or one or more other input devices. The input/output interfaces 1154 can receive executable instructions and/or data, storable in the data storage device (e.g., memory), representing a virtual dental model of a patient's dentition.

In some embodiments, the scanning device 1156 can be configured to scan one or more physical dental molds of a patient's dentition. In one or more embodiments, the scanning device 1156 can be configured to scan the patient's dentition, a dental appliance, and/or attachment placement structure directly. The scanning device 1156 can be configured to input data into the computing device 1142.

In some embodiments, the camera dock 1158 can receive an input from an imaging device (e.g., a 2D or 3D imaging device) such as a digital camera, a printed photograph scanner, and/or other suitable imaging device. The input from the imaging device can, for example, be stored in memory 1146.

The processor 1144 can execute instructions to provide a visual indication of a treatment plan, a dental appliance, and/or a one or more attachments on the display 1142. The computing device 1142 can be configured to allow a treatment professional or other user to input treatment goals. Input received can be sent to the processor 1144 as data 1148 and/or can be stored in memory 1146.

Such connectivity can allow for the input and/or output of data and/or instructions among other types of information. Some embodiments may be distributed among various computing devices within one or more networks, and such systems as illustrated in FIG. 11 can be beneficial in allowing for the capture, calculation, and/or analysis of information discussed herein.

The processor 1144, in association with the data storage device (e.g., memory 1146), can be associated with the data 1148. The processor 1144, in association with the memory 1146, can store and/or utilize data 1148 and/or execute instructions 1150 for creating and/or modeling interactions between an attachment and a tooth; interactions between an attachment and an appliance; and/or combinations of interactions between one or more attachments, one or more teeth and/or other structure in the mouth of the patient, and/or one or more appliances for moving teeth.

The processor 1144, in association with the memory 1146 can, in addition to or alternatively, store and/or utilize data 1148 and/or execute instructions 1150 for creating and/or modeling attachment placement structures and/or attachments, and/or adhesive and/or releasable materials, as well as a virtual modeling of such items with or without an appliance for moving teeth, and/or one or more teeth. The virtual model of the attachment placement structure and/or attachments to attach a dental appliance to the teeth of a patient can be used to create a physical dental appliance, attachment placement structure and/or attachments, for instance, as discussed further herein.

The processor 1144 coupled to the memory 1146 can, for example, include instructions to cause the computing device 1142 to perform a method including, for example, creating a treatment plan based on a virtual model of a jaw of a patient, wherein the treatment plan includes use of an attachment.

In some embodiments, the processor 1144 coupled to the memory 1146 can cause the computing device 1142 to perform the method comprising modeling a virtual dental attachment based on the treatment plan, wherein the virtual dental attachment is constructed to provide one or more forces desired by the treatment plan.

In various embodiments, the processor 1144 coupled to the memory 1146 can cause the computing device 1142 to perform the method comprising creating a virtual dental attachment placement apparatus that includes a body having an attachment mounting structure and including a surface having a contour that is shaped to correspond with a contour of an alignment surface of a tooth such that when the contour of the body and the corresponding contour of the tooth are aligned, the dental attachment is placed in the attachment mounting structure, the dental attachment is located at a particular position with respect to an exterior surface of the tooth.

Such analysis can be accomplished one or more times for a treatment plan. For example, if a treatment plan has 30 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 1144 can be a three dimensional or direct fabrication device that can create a dental appliance directly from instructions from the computing device 1142. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

In some embodiments, the attachment placement structure can be formed and one or more attachments formed with the attachment placement structure. Such technologies can be particularly useful in some such embodiments as the two can be fabricated during the same process.

The embodiments of the present disclosure can provide a number of benefits. For example, the embodiments can save time and cost in manufacture, improve the accuracy of the type of attachment material used, the preparation of the material, formation of the attachments, the positioning and/or orientation of the placement of the attachments, allow more ability to create specialized attachment sizes and shapes, and can save time and improve the experience of the patient and/or treatment professional in creating and/or securing attachments, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A dental attachment placement template comprising:
a dental attachment; and
a body configured to position the dental attachment over an attachment site on a surface of a tooth of a dental arch, the body including:
an aperture;
a plurality of supports that extend from the body within the aperture;
a connection member that connects the dental attachment to the plurality of supports, the connection member being integrally formed with the dental attachment to provide a unitary structure, the connection member being joined to the dental attachment at a breakable single point of connection and being further joined to the plurality of supports such that when the single point of connection is broken, the dental attachment is detached from the plurality of supports; and
a contoured surface shaped to register with one or more teeth of the dental arch to align the dental attachment over the attachment site when the body is placed on the dental arch.

2. The dental attachment placement template of claim 1, wherein the plurality of supports comprises three or more supports.

3. The dental attachment placement template of claim 1, wherein the plurality of supports are arranged radially around the dental attachment and the connection member.

4. The dental attachment placement template of claim 1, wherein the connection member is overlaid over the dental attachment.

5. The dental attachment placement template of claim 1, wherein the connection member is connected to the plurality of supports such that residual material is located in one area of the dental attachment after the connection member is severed, thereby facilitating removal of the residual material.

6. The dental attachment placement template of claim 1, wherein the connection member is connected to an outward facing surface of the dental attachment that is opposite a placement surface of the dental attachment, wherein the placement surface is configured to be placed on an affixing surface of the tooth.

7. The dental attachment placement template of claim 1, wherein the dental attachment is made of an attachment material configured to bond directly to the surface of the tooth upon exposure to ultraviolet light.

8. The dental attachment placement template of claim 1, wherein the dental attachment is prefabricated with the plurality of supports and the body.

9. The dental attachment placement template of claim 1, wherein the connection member comprises a material that is configured to dissolve when exposed to a stimulant to cause the connection member to detach from the dental attachment.

10. The dental attachment placement template of claim 1, wherein the connection member and the dental attachment are made of different materials.

11. The dental attachment placement template of claim 1, wherein the connection member and the dental attachment are three-dimensional (3D) printed.

12. The dental attachment placement template of claim 1, wherein the plurality of supports and the dental attachment are made of the same material.

13. A dental attachment placement template comprising:
a dental an attachment; and
a body configured to position the dental attachment over an attachment site on a surface of a tooth of a dental arch, the body including:
a first material that does not react to a stimulant;
an aperture;
a plurality of supports that extend from the body within the aperture;
a connection member that connects the dental attachment to the plurality of supports, the connection member being integrally formed with the dental attachment to provide a unitary structure, wherein the connection member is joined to the dental attachment at a single point of connection and being further joined to the plurality of supports, and wherein the connection member comprises a second material that is configured to dissolve or disintegrate when exposed to the stimulant to cause the connection member to detach from the dental attachment; and
a contoured surface shaped to register with one or more teeth of the dental arch to align the dental attachment over the attachment site when the body is placed on the dental arch.

14. The dental attachment placement template of claim 13, wherein the stimulant comprises wavelengths of light.

15. The dental attachment placement template of claim 13, wherein the stimulant comprises a chemical material.

16. The dental attachment placement template of claim 13, wherein the second material is configured to become more brittle upon exposure to the stimulant, thereby allowing the second material to be more easily broken.

17. The dental attachment placement template of claim 13, wherein the plurality of supports are made of the first material.

18. The dental attachment placement template of claim 13, wherein the connection member is connected to an outward facing surface of the dental attachment that is opposite a placement surface of the dental attachment, wherein the placement surface is configured to be placed on an affixing surface of the tooth.

19. The dental attachment placement template of claim 13, wherein the dental attachment includes one or more engagement surfaces, the one or more engagement surface configured to engage with a dental an once the dental attachment is bonded to the tooth and disconnected from the body.

20. A dental attachment placement template comprising:
a dental attachment; and
a body configured to position the dental attachment over an attachment site on a surface of a tooth of a dental arch, the body including:
an aperture;
a plurality of supports that extend from the body within the aperture;
a means for connecting the dental attachment to the plurality of supports, the means for connecting being integrally formed with the dental attachment to provide a unitary structure, the means for connecting being joined to the dental attachment at a breakable single point of connection and being further joined to and the plurality of supports such that when the means for connecting is broken, the dental attachment is detached from the plurality of supports; and
a contoured surface shaped to register with one or more teeth of the dental arch to align the dental attachment over the attachment site when the body is placed on the dental arch.

21. A dental appliance system comprising:
a dental attachment placement template comprising:
   an attachment; and
   a body configured to position the attachment over an attachment site on a surface of a tooth of a dental arch, the body including:
      a plurality of supports extending from the body and connected to the attachment via a connection member, the connection member being integrally formed with the attachment to provide a unitary structure, wherein the connection member is joined to the attachment at a breakable single point of connection and being further joined to and the plurality of supports such that when the single point of connection is broken, the attachment is detached from the plurality of supports; and
      a contoured surface shaped to register with one or more teeth of the dental arch to align the attachment over the attachment site when the body is placed on the dental arch; and
   one or more dental appliances configured to engage with the attachment to apply one or more repositioning forces to the tooth when the attachment is bonded to the surface of the tooth at the attachment site and the one or more dental appliances is placed on the dental arch.

22. The dental appliance system of claim 21, wherein the attachment is positioned within an aperture of the body, wherein the plurality of supports support the attachment within the aperture.

23. The dental appliance system of claim 21, wherein the connection member comprises a material that is configured to dissolve or disintegrate when exposed to a stimulant to cause the connection member to detach from the attachment.

* * * * *